United States Patent [19]

Jain et al.

[11] 4,068,105

[45] Jan. 10, 1978

[54] CENTRAL STATION SYSTEM TRANSMISSION APPARATUS

[75] Inventors: Prem Prakash Jain, Merrifield, Va.; James John Bernitt, Stamford, Conn.

[73] Assignee: American District Telegraph Company, Jersey City, N.J.

[21] Appl. No.: 690,992

[22] Filed: May 28, 1976

[51] Int. Cl.$^{2}$ .................................... H04B 3/46

[52] U.S. Cl. .................................... 179/175.3 R; 324/51; 340/146.1 BE; 340/214

[58] Field of Search .................... 179/175.3 R, 175; 324/51; 340/146.1 BE, 214; 307/4, 28, 146, 147

[56] References Cited

U.S. PATENT DOCUMENTS

| | | | |
|---|---|---|---|
| 253,080 | 1/1882 | McCulloh | 340/292 |
| 477,068 | 1/1892 | Rowand | 340/218 |
| 3,497,619 | 2/1970 | Babcock | 307/4 |
| 3,500,377 | 3/1970 | Muehter | 340/287 |
| 3,652,867 | 3/1972 | Zinn | 307/86 |
| 3,987,341 | 10/1976 | Clark | 324/51 |
| 3,989,908 | 11/1976 | Budrys et al. | 179/175.3 R |

OTHER PUBLICATIONS

"McCulloh Circuit Operation" *ADT Bulletin*, 8-61, pp. 1-8.

*Primary Examiner*—Douglas W. Olms
*Attorney, Agent, or Firm*—Robert R. Jackson

[57] ABSTRACT

Apparatus for transmitting signal information between central and remote stations in a central station system such as a central station alarm system. The transmission apparatus can continue to transmit information despite the occurrence of any of several types of fault conditions in the transmission line. Apparatus can be provided for detecting various transmission line fault conditions, indicating the nature of those fault conditions, and modifying the transmission apparatus to compensate for those fault conditions.

39 Claims, 11 Drawing Figures

CENTRAL STATION SYSTEM TRANSMISSION APPARATUS

BACKGROUND OF THE INVENTION

This invention relates to central station systems such as central station alarm systems, and more particularly to improved transmission apparatus for such systems.

Central station systems typically include a central station and a plurality of remote stations connected to the central station by a transmission line or loop. The system can be constructed so that a remote station spontaneously transmits coded signal information to the central station representing conditions at the remote station, or the central station may be periodically interrogate the remote stations by transmitting coded signals identifying the remote stations in turn and each remote station responds by transmitting coded signals indicating conditions at that remote station. The central station may utilize the information received from the remote stations in a variety of ways. For example, the central station may decode and display that information for the operator of the system, or the central station may initiate or perform other operations appropriate to the condition of the remote stations. The central station may transmit additional signals to a remote station causing apparatus at the remote station to initiate or perform certain operations to alter conditions at the remote station.

Central station systems are used in a variety of applications. Central station alarm systems are used, for example, to monitor one or more alarm conditions (e.g., smoke, fire, burglary, power loss, refrigeration loss, etc.) at a plurality of remote locations and to transmit signals indicating the occurrence of such an alarm condition either spontaneously (i.e., when the alarm condition occurs) or when interrogated as mentioned above. This information is received by the central station which typically decodes and displays the information for the operator of the system who then initiates action appropriate to the alarm condition detected (e.g., advises police or fire authorities of the occurrence and location of the alarm condition). Central station systems may also be used to monitor conditions throughout an electric power distribution system, a pipeline system, or any other similar system. Central station systems may be used for process monitoring and control (e.g., chemical process monitoring and control) where conditions at a number of physically remote locations must be monitored and possibly controlled.

The size of a central station system may vary considerably. A central station alarm system, for example, may include remote stations at a plurality of geographically remote locations or premises. On the other hand, such a system may service only a single plant, or building. For example, remote stations may be located on the several floors of a high-rise office building and the central station may be located on the main floor of that building.

Although the present invention will be described herein in its application to central station alarm systems for use in a single plant or building, the invention is not limited to such systems, and it will be understood that the principles of the invention are applicable to central station systems generally, including any of the various types mentioned specifically above.

Any of a variety of faults can occur in the transmission line connecting the central station with the remote stations in a central station system. For example, a break in one of the transmission line wires or the grounding of one of those wires can disable the entire system unless some form of protective device is provided. U.S. Pat. No. 253,080 issued to C. F. McCulloh on Jan. 31, 1882, shows a system which can continue to operate despite a break in or grounding of a transmission line wire. There are, however, other types of fault conditions (e.g., wire to wire short circuits) which can occur, particularly in more sophisticated systems requiring transmission lines having two or more wires. Protection against these other types of fault conditions, as well as against broken or grounded wires, is therefore required.

It is accordingly an object of this invention to provide improved transmission apparatus for central station systems.

It is a more particular object of this invention to provide transmission apparatus for central station systems which can continue to operate despite the occurrence of any of several types of fault conditions in the transmission line, including a broken wire, a grounded wire, a wire to wire short circuit, and various combinations thereof.

It is a further and more particular object of this invention to provide transmission apparatus for central station systems which includes means for indicating which of the several types of fault conditions mentioned above is occurring when such a fault condition occurs.

It is still another more particular object of this invention to provide transmission apparatus for central station systems which includes means for modifying the transmission circuits to maintain communication between the central and remote stations when a fault condition occurs which would otherwise interrupt said communication.

Certain aspects of this invention are applicable to systems in which information is transmitted alternately from the central station to the remote stations and from the remote stations to the central station (two-way transmission). Other apsects of the invention are applicable both to those systems and to systems in which information is transmitted only from the remote stations to the central station (one-way transmission). The invention will be described in its application to two-way transmission systems, it being understood that if one-way transmission is all that is required, the portion of the apparatus provided for transmission of information from the central station to the remote stations can be omitted.

SUMMARY OF THE INVENTION

The foregoing objects of the invention are accomplished in accordance with the principles of the invention by providing a transmission system including three conduction paths between the central and remote stations. The first and second of these conduction paths transmit information between the central and remote stations, and the third conduction path is a return or common path connected to a source of reference potential at the central station. Two other potential sources are provided at the central station: a first source of potential which is positive with respect to reference potential, and a second source of potential which is negative with respect to reference potential.

When information is to be transmitted from the central station to the remote station, transmitter means are provided at the central station for modulating the output signal of the first potential source to produce a first signal representative of the information to be transmitted and for modulating the output signal of the second potential source to produce a second complementary signal representative of this same information. The first and second signals are respectively applied to the first and second conduction paths. A remote station receives the information transmitted by detecting the flow of current through receiver circuits connected between the first and second conduction paths and the third conduction path. The receiver circuits are balanced so that normally the current flowing from the first conduction path to the third conduction path is approximately equal to the current flowing from the third conduction path to the second conduction path and there is therefore negligible net current in the third conduction path.

When information is to be transmitted from a remote station to the central station, the first and second conduction paths are respectively connected to the second and first potential sources at the central station. Transmitter circuits connected between the first and second conduction paths and the third conduction path are provided at the remote station for modulating the signals thus applied to the first and second conduction paths to produce complementary signals, each representative of the information to be transmitted, in the first and second conduction paths. The central station receives the information transmitted by detecting the currents flowing in the first and second conduction paths. The current flowing from the third conduction path to the first conduction path is normally equal to the current flowing from the second conduction path to the third conduction path so that there is again normally negligible net current in the third conduction path.

If either of the first and second conduction paths is open or broken, information is transmitted satisfactorily via the circuit including the remaining one of the first and second conduction paths and the third conduction path. The fact that one of these paths is broken can be detected by the presence of a current in the third conduction path or by the absence of current in the broken path during the transmission of information. The identity of the broken path can be determined by detecting the direction of current flow in the third conduction path or by the absence of current in the broken path. If the first and second conduction paths are intact and the third conduction path is broken, there is no effect on transmission since there is normally no current in the third path. The fact that the third conduction path is broken can be detected by opening one of the first and second conduction paths during information transmission and simultaneously testing for current in the remaining one of the first and second paths or in the third conduction path. If there is no such current, the third conduction path is broken.

If either of the first and second conduction paths is short circuited with the third conduction path, information is transmitted satisfactorily via the circuit including the remaining one of the first and second conduction paths and the third conduction path. The fact that one of these paths is short circuited with the third conduction path can be detected by detecting a constant flow of current in that conduction path during transmission of information to the central station. If the first and second conduction paths are short circuited with one another, there will be a constant flow of current in both paths during attempted transmisssion of information to the central station. When this condition is detected, one of the first and second conduction paths is opened and information is transmitted satisfactorily via the circuit including the remaining one of the first and second conduction paths and the third conduction path.

To detect the grounding of either of the first and second conduction paths, a first ground detection circuit is provided and connected between the source of reference potential and ground. If either of the first and second conduction paths is grounded, information continues to be transmitted satisfactorily via the circuit including the remaining one of the first and second conduction paths and the third conduction path. The fact that one of the first and second conduction paths is grounded can be detected by the flow of current through the first ground detection circuit, and the identity of the grounded path can be determined by detecting the direction of current flow through the first ground detection circuit. If the first and second conduction paths are intact and the third conduction path is grounded there is no effect on transmission since there is normally no current on the third conduction path. To detect the grounding of the third conduction path a second ground detection circuit is provided and selectively connected between the first or second conductor and ground during information transmission. When the first or second conductor is thus connected to ground via the second ground detection circuit, the first ground detection circuit is disconnected. If current flows in the second ground detection circuit, the third conductor is grounded.

Further features of the invention, its nature and various advantages will be more apparent from the accompanying drawing and the following detailed description of the invention.

Figure 4:
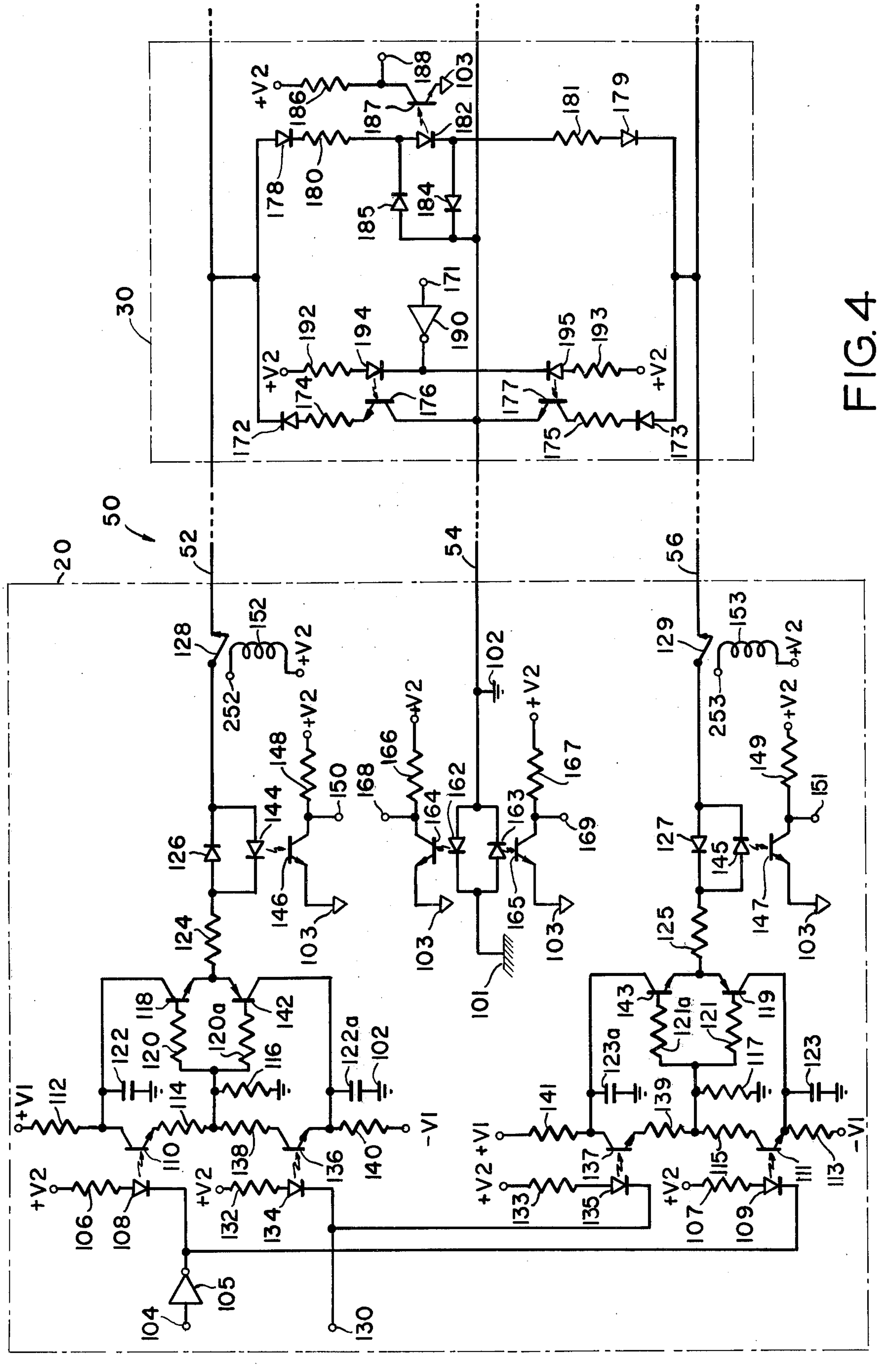
Figure 5:
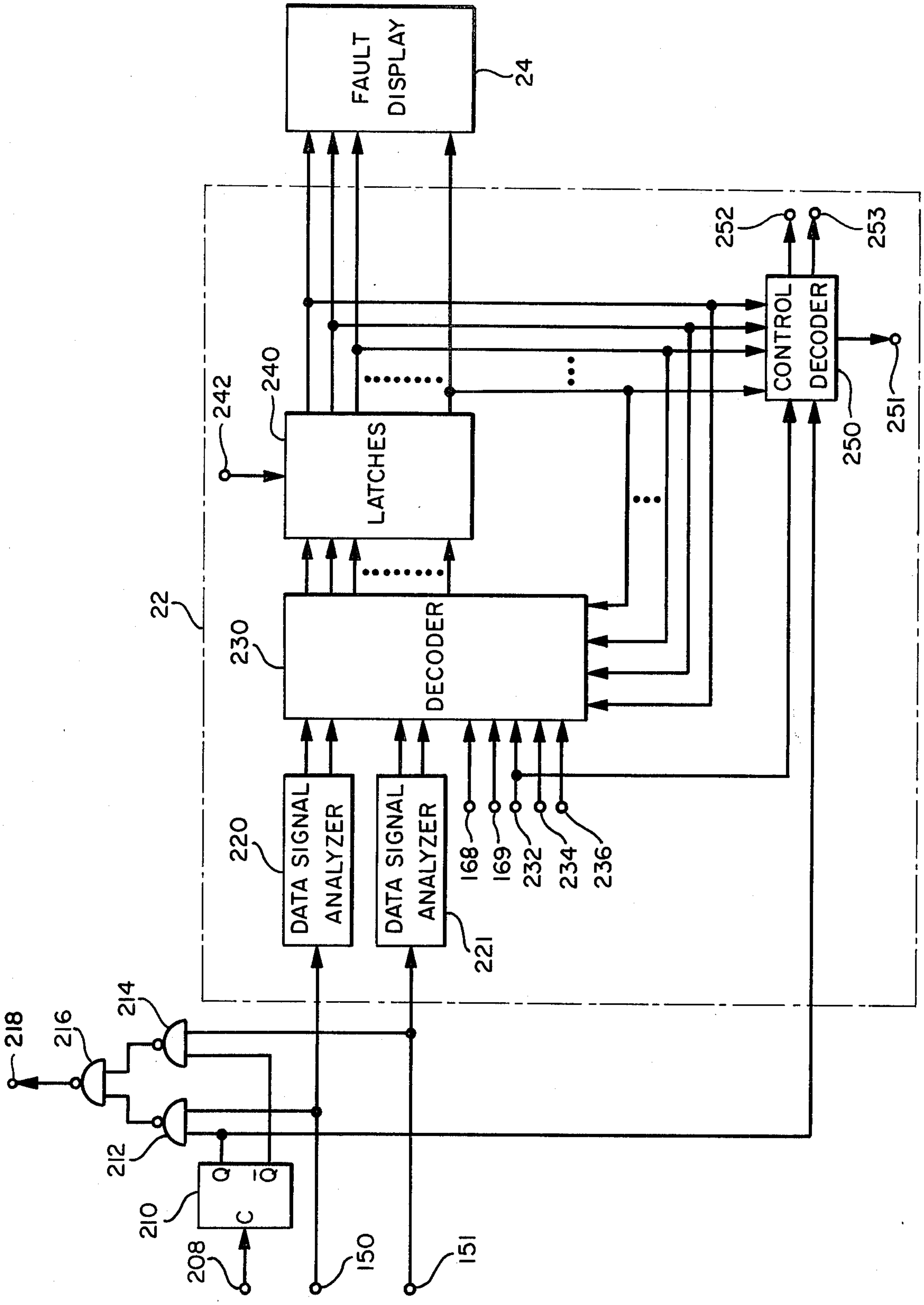
Figure 6:
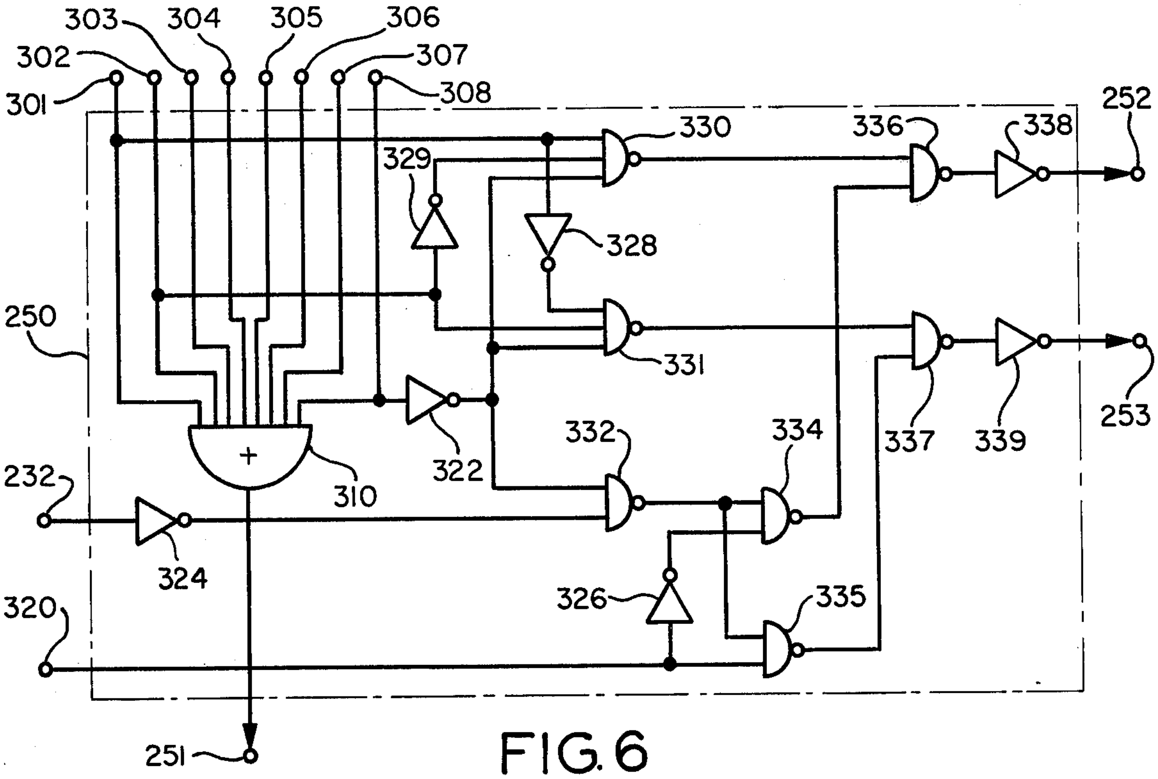
Figure 7:
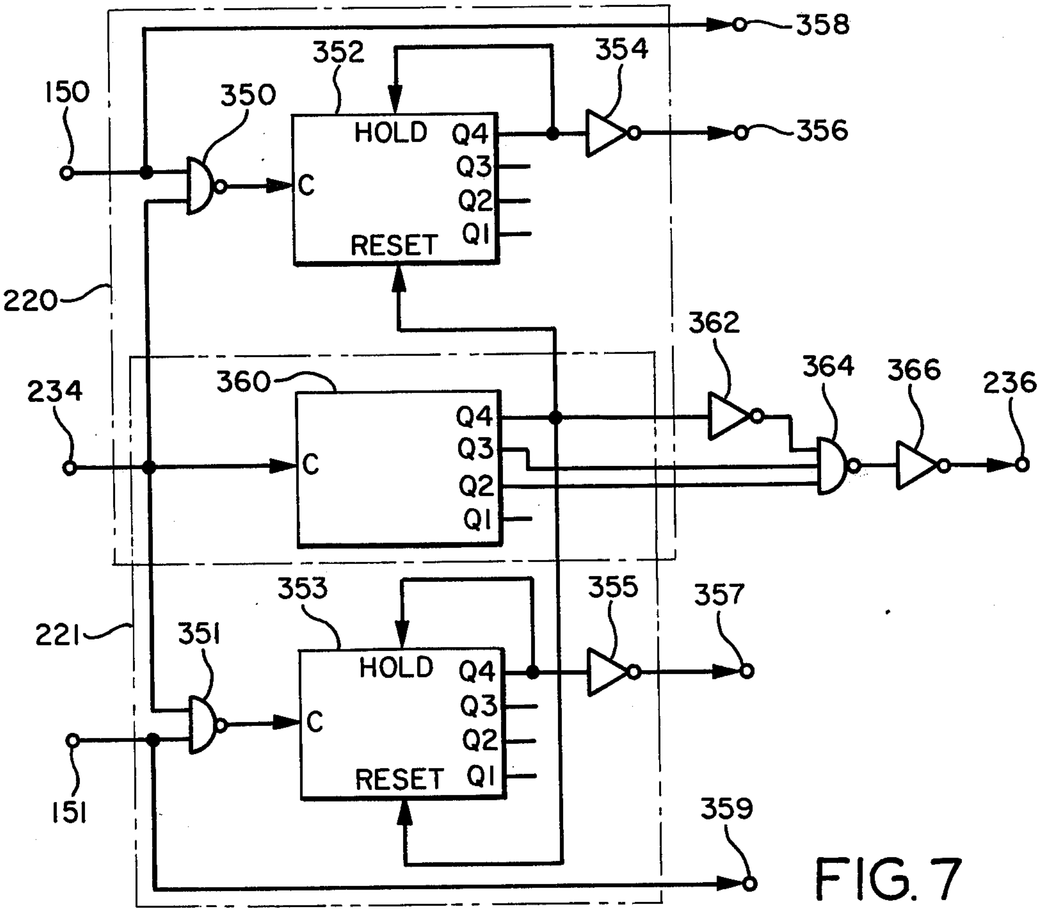
Figure 8:
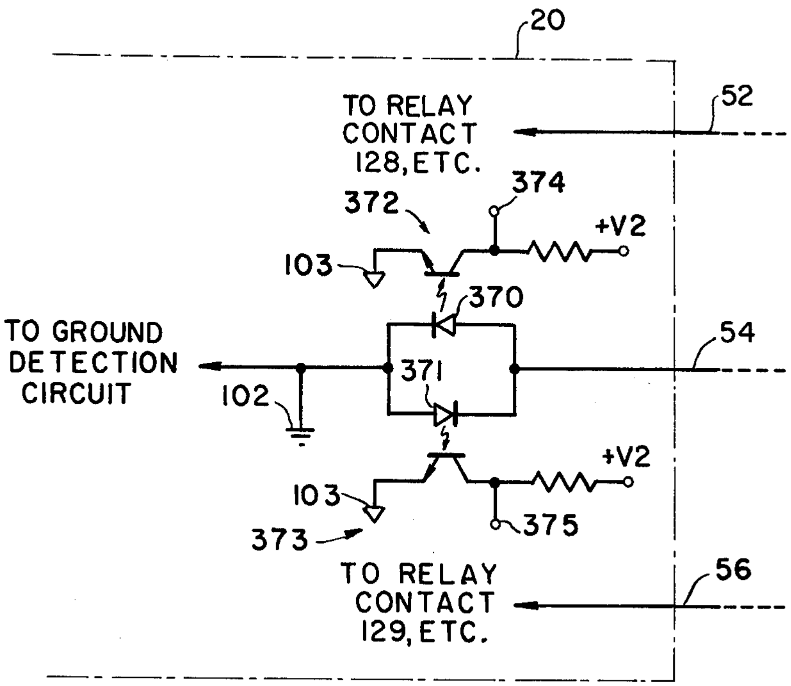
Figure 9:
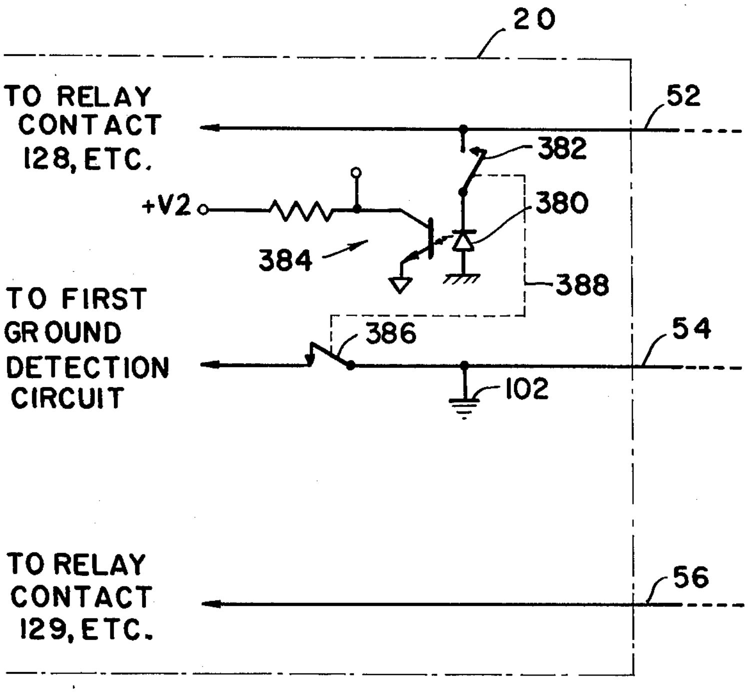

FIGS. *2a, 2b, 3a,* and *3b* are signal traces useful in explaining the operation of the transmission apparatus of this invention;

FIG. 4 is a schematic diagram of one embodiment of a portion of the transmission apparatus of this invention;

FIG. 5 is a schematic block diagram of another portion of the transmission apparatus of this invention;

FIG. 6 is a schematic diagram showing one of the elements in FIG. 5 in greater detail;

FIG. 7 is a schematic block diagram showing in greater detail a possible implementation of several of the elements in FIG. 5;

FIG. 8 is a schematic diagram showing a possible modification of the apparatus of FIG. 4; and FIG. 9 is a schematic diagram showing another possible modification of the apparatus of FIG. 4.

DETAILED DESCRIPTION OF THE INVENTION

Although the principles of this invention are applicable to a wide variety of central station systems, the invention will be fully understood from an explanation of its application to central station alarm systems of the type mentioned above in which a central station periodically transmits coded signals identifying each of the remote stations connected to it in turn, and an identified remote station responds by sending back coded signals indicating which (if any) of several alarm conditions are occurring at that remote station. Similarly, although the invention is also applicable to many different types of signalling and information coding, the invention will be fully understood from an explanation of its application to baseband transmission of binary-coded information. The central station alarm system transmission apparatus described in detail herein operates in the current mode (i.e., information is coded as the presence or absence of a predetermined current), as may be preferable for improved noise immunity. However, it will be understood that the principles of this invention are equally applicable to systems in which information is coded as the presence or absence of a predetermined voltage.

Figure 1:
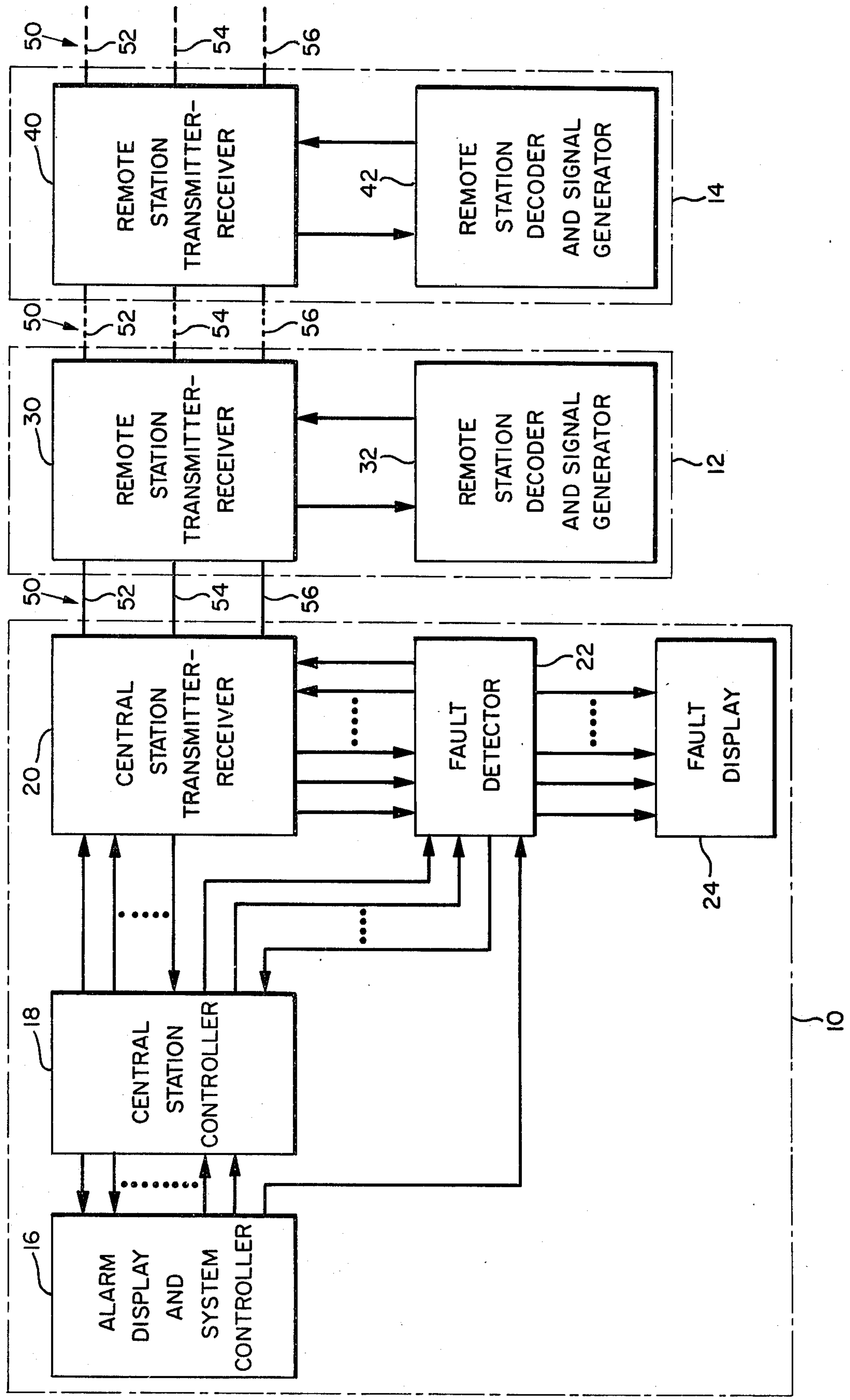
FIG. 1 is a block diagram of a central station system including the transmission apparatus of this invention.

As shown in FIG. 1, a central station alarm system including the transmission apparatus of this invention includes central station 10 and a plurality of remote stations, of which remote stations 12 and 14 are typical. Central station 10 includes alarm display and system controller 16, central station controller 18, central station transmitter-receiver 20, fault detector 22, and fault display 24. Remote stations 12 and 14, respectively, include remote station transmitter-receivers 30 and 40 and remote station decoder and signal generators 32 and 42. Central station 10 is connected to remote stations 12, 14 by transmission line 50. More particularly, central station transmitter-receiver 20 in central station 10 is connected to remote station transmitter-receivers 30 and 40 in remote stations 12 and 14, respectively, by transmission line 50. Transmission line 50 includes three conductors 52, 54, and 56, each of which is a bus running from central station transmitter-receiver 20 through the transmitter-receiver for each remote station. For reasons which will be more apparent hereinafter, conductors 52 and 56 are referred to as data leads or lines 52 and 56, and conductor 54 is referred to as common lead or line 54.

Central station controller 18 generates signals for controlling the operation of the system. These signals include timing signals for alternately placing central station transmitter-receiver 20 in the transmit and receive modes, and for periodically enabling fault detector 22 to detect any of several types of faults which can occur on transmission line 50. Central station controller 18 also generates the data to be transmitted by central station transmitter-receiver 20 to the remote stations, and decodes the reply data received from the remote stations by transmitter-receiver 20. If the reply data indicates the occurrence of one or more alarm conditions at a remote station, central station controller 18 produces output signals indicating the location and type of alarm condition occurring. These signals are applied to alarm display and system controller 16 which displays the alarm information to the operator of the system. Central station controller 18 may also be responsive to signals from alarm display and system controller 16. For example, the system may be at least partly controlled by the operator of the system who may operate manual controls associated with system controller 16. Alternatively or in addition, the operator of the system may be able to supply data to system controller 16 for transmission to the remote stations via central station controller 18 and transmitter-receiver 20. Central station controller 18 and alarm display and system controller 16 may be special purpose digital computer apparatus or suitably programmed general purpose digital computer apparatus with appropriate input, output, and display devices.

Fault detector 22 monitors a number of signals produced by central station transmitter-receiver 20 to detect any of several fault conditions which can occur on transmission line 50 (e.g., a broken or grounded conductor, or conductors which are short circuited to one another). Typically, at least some of these signals are monitored only while transmitter-receiver 20 is in the receive mode. Accordingly, the output signal of central station controller 18 which controls the mode of transmitter-receiver 20 is also applied to fault detector 22. Periodically, fault detector 22 compares the signals being monitored (or, in the case of some signals, the results of an analysis of those signals) and produces output signals applied to fault display 24 indicating which fault conditions (if any) have occurred. Fault display 24 displays this information for the operator of the system. Fault detector 22 may perform this periodic comparison or analysis of the signals monitored in response to internal timing control (for example, by counting a predetermined number of transitions in the transmit-receive output signal of controller 18) or in response to a periodic strobe signal produced by controller 18. Certain of the tests performed by fault detector 22 may require the opening of one of data leads 52 or 56 or other modification of transmission line 50. These special tests are also performed periodically in response to special test signals produced by controller 18. Fault detector 22 then produces output signals applied to transmitter-receiver 20 for opening one of leads 52 or 56 or otherwise modifying transmission line 50. When certain fault conditions are detected, fault detector 22 also opens one of leads 52 or 56 to permit the transmission apparatus to continue to operate using the other data lead. When any fault condition is detected, fault detector 22 may also produce an output signal applied to controller 18 as a fault alarm signal. After a fault has been detected, the operator may be required to acknowledge the fault indication by causing system controller 16 to produce an output signal for resetting fault detector 22. Resetting fault detector 22 also resets fault display 24.

Figure 2A:
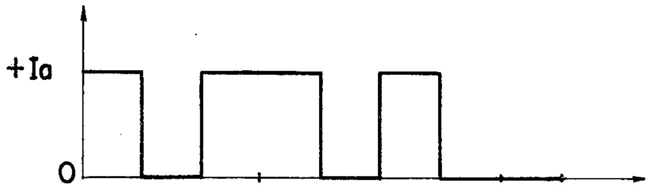
Figure 2B:
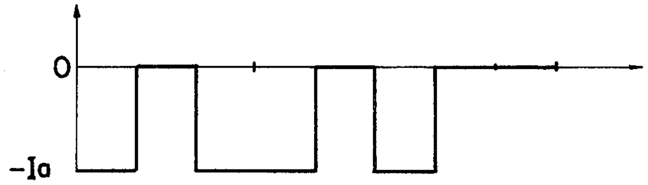

During normal operation of the system, central station controller 18 generates binary coded signals identifying each of remote stations 12, 14 in turn. These signals are applied to central station transmitter-receiver 20 which reproduces these signals as complementary data output signals on data leads 52 and 56. FIGS. *2a* and *2b* illustrate what is meant by complementary data output signals. FIG. *2a* shows a typical data output signal applied to data lead 52 and FIG. *2b* shows the data output signal applied to data lead 56 during the same time interval. These signals are complementary in the sense that when current +Ia is applied to data lead 52, an equal but opposite current −Ia is applied to data lead 56. When zero current is applied to data lead 52, zero current is also applied to data lead 56. A non-zero current on either data lead (i.e., either +Ia or −Ia) may represent binary 1; a zero current on these leads then represents binary 0. Each interval marked off along te baseline in FIG. 2 represents the duration of one binary data digit or bit. Reading from left to right, the signal trace in either FIG. *2a* or *2b* represents the binary data 10110100. To produce these signals in data leads 52 and 56, these leads are selectively connected by switching means to positive and negative potential sources, respectively, at central station transmitter-receiver 20. Common lead 54 is connected to a source of reference potential at central station transmitter-receiver 20.

In the transmitter-receivers 30, 40 for each of remote stations 12, 14, each of data leads 52 and 56 is connected to common lead 54 across a receiver circuit. Means are provided in each of transmitter-receivers 30, 40 for detecting the currents flowing through the receiver circuits to produce a data output signal applied to the decoder and signal generators 32, 42 for that remote station. A portion of the non-zero current (+Ia or −Ia) applied to each of data leads 52 and 56 is therefore used in the transmitter-receiver for each of remote stations 12, 14. When the system is operating normally, the portion of the non-zero current from data lead 52 used in each remote station is preferably the same as the portion of the non-zero current from data lead 56 used in that remote station. Accordingly, there is preferably substantially no net current in common lead 54 and all the current flowing from central station transmitter-receiver 20 on data lead 52 returns to transmitter-receiver 20 on data lead 56.

Each of remote station decoder and signal generators 32, 42 decodes the data output signal from the associated remote station transmitter-receivers 30, 40 to determine whether the data transmitted by the central station is the code identifying that remote station. When a remote station determines that the central station has transmitted its code, the decoder and signal generator 32 or 42 for that remote station generates a reply data signal which is applied to the associated remote station transmitter-receiver 30 or 40 for transmission back to central station transmitter-receiver 20. The reply signal typically includes data regarding the status of the remote station (e.g., which, if any, of several possible alarm conditions are occurring at the remote station). In order to permit such reply signals to be received, central station 10 switches from the transmit mode to the receive mode after each transmission of the code for a remote station.

The remote station transmitter-receiver 30 or 40 to which a reply data signal is applied as mentioned above reproduces that signal as complementary data output signals on data leads 52 and 56. FIGS. *3a* amd *3b* show typical reply data signals respectively produced on data leads 52 and 56 by a remote station transmitter-receiver 30 or 40. These signals are complementary in the same sense that the signals transmitted by central station 10 are complementary, although the direction of non-zero current flow in each of data leads 52 and 56 is reversed relative to the direction of non-zero current flow during transmission from central station 10. Accordingly, when current −Ib flows in data lead 52, as shown in FIG. *3a*, an equal and opposite current +Ib flows in data lead 56. When zero current flows in data lead 52, zero current also flows in data lead 56. To produce these reply data signals in data leads 52 and 56, leads 52 and 56 are respectively connected by switching means to negative and positive potential sources at central station transmitter-receiver 20, common lead 54 remains connected to the source of reference potential at central station transmitter-receiver 20, and switching means in the remote station transmitter-receiver 30 or 40 transmitting the reply signal are operated to selectively connect data leads 52 and 56 to common lead 54 to cause currents to flow in leads 52 and 56 as required to represent the data to be transmitted. In other words, central station transmitter-receiver 20 provides the sources of the currents on data leads 52 and 56 and the remote station transmitter-receiver 30 or 40 switches those currents on and off to represent the reply data to be transmitted. To receive the reply data, central station transmitter-receiver 20 detects the currents on data leads 52 and 56 and produces a reply data output signal applied to central station signal controller 18. This apparatus decodes the reply data signal and initiates action appropriate to the reply signal, e.g., produces alarm signals for display by alarm display and system controller 16. As during normal transmission of data from central station 10, during normal transmission of data from any of the remote stations, the non-zero current in data lead 52 is preferably substantially equal to the non-zero current in data lead 56 and there is therefore negligible current in common lead 54.

The transmission apparatus employed in the system of FIG. 1 is shown in greater detail in FIG. 4. Consistent with FIG. 1, the central station transmitter-receiver apparatus is shown in FIG. 4 surrounded by broken line 20 and the transmitter-receiver apparatus for a typical remote station is shown in FIG. 4 surrounded by broken line 30. Transmission line 50, including data leads 52 and 56 and common lead 54, connects central station transmitter-receiver 20 with remote station transmitter-receiver 30. A source of positive potential is connected to all terminals labelled +V1 in central station transmitter-receiver 20 and a source of negative potential is connected to all terminals labelled −V1 in transmitter-receiver 20. Earth ground is represented by the symbol 101 in FIG. 4. A source of reference potential (midway between +V1 and −V1) is represented by symbols similar to 102 in FIG. 4 and is chosen to be at a different potential than earth ground, although this difference is preferably less than the difference between +V1 or −V1 and reference potential (i.e., earth ground is preferably between +V1 and −V1). A source of logic potential is connected to all terminals labelled +V2 in central station transmitter receiver 20 and a similar source of logic potential is connected to all terminals labelled +V2 in remote station transmitter-receiver 30. Logic ground is represented by the symbol 103 in FIG. 4. Although the logic potential is indicated to be positive, it will be understood that this is entirely arbitrary and that there is no necessary relationship between the logic potential and any other potential value in the system.

Data to be transmitted to the remote stations is applied to terminal 104 in central station transmitter-receiver 20 from central station controller 18 (FIG. 1). While data is being transmitted by central station transmitter-receiver 20, central station controller 18 also applies a "transmit" signal at least approximately equal to +V2 to terminal 130. This transmit signal keeps light emitting diodes 134 and 135 cut off and disconnects data leads 52 and 56 from potential sources −V1 and +V1, respectively, as discussed in greater detail below.

A signal representative of binary 1 applied to terminal 104 causes the output terminal of inverter 105 to fall to a potential below +V2; a signal representative of binary 0 causes the output terminal of inverter 105 to rise to a potential at least approximately equal to +V2. Accordingly, a binary 1 signal applied to terminal 104 causes current to flow from potential source +V2 through resistor 106 and light emitting diode 108 to inverter 105 and from potential source +V2 through resistor 107 and light emitting diode 109 to inverter 105. A binary 0 signal applied to terminal 104 cuts off the flow of current through diodes 108 and 109. While current is flowing through diodes 108 and 109, these devices emit light which is optically coupled to photo-transistors 110 and 111. Photo-transistor 110 is connected in series with resistors 112, 114, and 116 between potential source +V1 and the reference potential source, and photo-transistor 111 is similarly connected in series with resistors 113, 115, and 117 between potential source −V1 and the reference potential source. When diodes 108 and 109 emit light, photo-transistors 110 and 111 conduct and transistors 118 and 119 also conduct. The collectors of transistors 118 and 119 are respectively connected between resistor 112 and the collector of photo-transistor 110 and between resistor 113 and the emitter of photo-transistor 111. The bases of transistors 118 and 119 are respectively connected between resistors 114 and 116 via resistor 120 and between resistors 115 and 117 via resistor 121. Capacitors 122 and 123 are respectively connected between the collectors of transistors 118 and 119 and the source of reference potential to absorb transients and prevent erroneous triggering of transistors 118 and 119.

While transistor 118 conducts, current flows from potential source +V1, through transistor 118 and is applied to data lead 52 by way of resistor 124, diode 126, and normally closed relay contact 128. This current on data lead 52 is the current +Ia discussed above. Current similarly flows from data lead 56 through normally closed relay contact 129, diode 127, resistor 125, and transistor 119 to potential source −V1. This current on data lead 56 is the current −Ia discussed above. When the flow of current through diodes 108 and 109 is cut off, these devices cease emitting light. Transistors 110, 111, 118, and 119 therefore cease to conduct, and the currents on data leads 52 and 56 go to zero. Accordingly, the transmitter portion of central station transmitter-receiver 20 applies complementary output signals on data leads 52 and 56 when data is to be transmitted to the remote stations as discussed above in connection with FIG. 1. Common lead 54 is connected to the source of reference potential at central station transmitter-receiver 20. The remainder of the apparatus associated with common lead 54 in transmitter-receiver 20 is for fault detection (particularly ground detection) and is discussed in detail below.

As is further shown in FIG. 4, remote station transmitter-receiver 30 includes separate transmitter and receiver portions. The apparatus to the left of terminal 171 as viewed in FIG. 4 is the transmitter portion of the apparatus, and the apparatus to the right of terminal 171 is the receiver portion of the apparatus. In the transmitter portion of the apparatus data lead 52 is connected to common lead 54 across diode 172, resistor 174, and transistor 176, connected in series as shown, and data lead 56 is connected to common lead 54 across diode 173, resistor 175, and transistor 177, also connected in series. Diodes 172 and 173 are polarized so that no currents flow through this transmitter portion of the apparatus during transmission of data from central station transmitter-receiver 20.

In the receiver portion of transmitter-receiver 30 data lead 52 is connected to common lead 54 across diode 178, resistor 180, light emitting diode 182, and diode 184, connected in series, and data lead 56 is connected to common lead 54 across diode 179, resistor 181, light emitting diode 182, and diode 185, also connected in series. It will be observed that light emitting diode 182 is common to both of these portions of the receiver apparatus. Diodes 178 and 179 (as well as the other diodes in this portion of the apparatus) are polarized so that at least a portion of the non-zero currents applied to data leads 52 and 56 during transmission of data from central station transmitter-receiver 20 flows through the receiver portion of transmitter-receiver 30. In particular, a portion of the non-zero current +Ia applied to data lead 52 flows through elements 178, 180, and 182 (and may flow through diode 184 to common lead 54) and a portion of the non-zero current −Ia applied to data lead 56 (which may flow from common lead 54 through diode 185) flows through elements 182, 181, and 179. The two portions of the receiver circuit apparatus are preferably balanced so that when the system is operating normally, the current flowing into the receiver circuit apparatus from data lead 52 is preferably substantially equal to the current drawn from that apparatus to data lead 56. Accordingly, there is normally substantially no current in either of diodes 184 and 185 and there is no net current in common lead 54.

Light emitting diode 182 is part of the data read-out portion of transmitter-receiver 30 which also includes resistor 186 and photo-transistor 187 connected in series between potential source +V2 and logic ground 103. Although a photo-transistor 187 is shown associated with light emitting diode 182 in FIG. 4, a higher gain device such as a photo-Darlington can be substituted for photo-transistor 187 or any other photo-transistor in the circuit if improved signal discrimination is required or desired. The current pulses flowing through light emitting diode 182 during transmission of data from central station transmitter-receiver 20 as described above cause that device to emit corresponding light pulses. These light pulses are optically coupled to photo-transistor 187 which conducts current while light is applied to it and is nonconducting otherwise. The voltage applied to output terminal 188, connected to a point intermediate resistor 186 and the collector of transistor 187, rises to +V2 when transistor 187 is nonconducting and falls to logic ground when transistor 187 is conducting. The voltage signal applied to terminal 188 therefore corresponds to the data transmitted by central station transmitter-receiver 20. This signal is applied to the remote station decoder and signal generator associated with transmitter-receiver 30 (i.e., decoder and signal generator 32 in the system of FIG. 1) as the data output signal to be decoded by that apparatus.

When reply data is to be transmitted from remote station transmitter-receiver 30 to central station transmitterreceiver 20, central station controller 18 (FIG. 1) switches to the receive mode. In this mode, central station controller 18 applies a "receive" signal substantially less than +V2 to terminal 130 in transmitter-receiver 20 and also applies no data to terminal 104. Accordingly, no current flows through diodes 108 and 109 and none of transistors 110, 111, 118, or 119 conducts. Data lead 52 is therefore effectively disconnected from potential source +V1 and data lead 56 is similarly disconnected from potential source −V1. The receive signal applied to terminal 130 causes current to flow from potential source +V2 through resistor 132 and light emitting diode 134 to terminal 130 and from potential source +V2 through resistor 133 and light emitting diode 135 to terminal 130. The currents flowing through diodes 134 and 135 cause those devices to emit light which is optically coupled to photo-transistors 136 and 137, respectively. Since photo-transistors 110 and 111 are cut off, photo-transistor 136 is effectively connected in series with resistors 116, 138, and 140 between the source of reference potential and potential source −V1, and photo-transistor 137 is similarly connected in series with resistors 141, 139, and 117 between potential source +V1 and the source of reference potential. When photo-transistor 136 conducts, transistor 142 conducts and potential souce −V1 is connected to data lead 52 by way of resistor 140, transistor 142, resistor 124, light emitting diode 144, and normally closed relay contact 128. Similarly, when photo-transistor 137 conducts, transistor 143 conducts and potential source +V1 is connected to data lead 56 by way of resistor 141, transistor 143, resistor 125, light emitting diode 145, and normally closed relay contact 129. The collectors of transistors 142 and 143 are respectively connected between resistor 140 and the emitter of photo-transistor 136 and between resistor 141 and the collector of photo-transistor 137. The bases of transistors 142 and 143 are respectively connected between resistors 116 and 138 via resistor 120*a* and between resistors 117 and 139 via resistor 121*a*. Capacitors 122*a* and 123*a* are respectively connected between the collectors of transistors 142 and 143 and the source of reference potential to absorb transients and prevent erroneous triggering of transistors 142 and 143. Common lead 54 remains connected to the source of reference potential at transmitter-receiver 20.

It will be noted that diodes 178 and 179 (and other elements) in the receiver portion of remote station transmitter-receiver 30 are reverse-biased by the potentials applied to data leads 52 and 56 when central station transmitter-receiver 20 is in the receive mode as described above. Accordingly, no currents flow through the receiver portion of transmitter-receiver 30 while transmitter-receiver 20 is in the receive mode.

If data is to be transmitted from the remote station including transmitter-receiver 30, voltage pulses representing the data to be transmitted are applied to terminal 171 from the remote station decoder and signal generator associated with transmitter-receiver 30 (e.g., decoder and signal generator 32 in the system of FIG. 1). A voltage representative of binary 1 applied to terminal 171 causes the output voltage of inverter 190 to drop to a potential which is low relative to potential +V2. Accordingly, current flows from potential source +V2 through resistor 192 and light emitting diode 194 to inverter 190, and also through resistor 193 and light emitting diode 195 to inverter 190. A voltage representative of binary 0 applied to terminal 171 causes the output voltage of inverter 190 to rise to a potential which is at least approximately equal to potential +V2, thereby cutting off the flow of current through light emitting diodes 194 and 195. The data pulses applied to terminal 171 therefore cause corresponding current pulses through light emitting diodes 194 and 195.

Figure 3A:
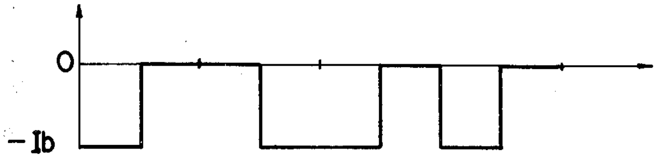
Figure 3B:
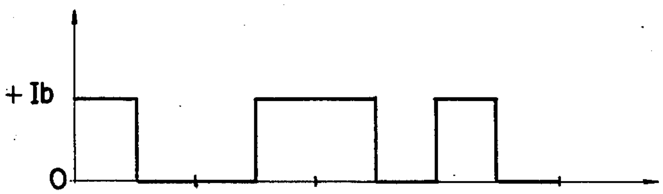

The current pulses flowing through light emitting diodes 194 and 195 cause those devices to emit corresponding light pulses which are optically coupled to photo-transistors 176 and 177, respectively. Photo-transistors 176 and 177 conduct while light is applied to them and are nonconducting otherwise. Accordingly, photo-transistors 176 and 177 respectively constitute switching means for closing circuit paths from data leads 52 and 56 to common lead 54. Since a negative potential is applied to data lead 52 at central station transmitter-receiver 20, current flows through photo-transistor 176 to data lead 52 when photo-transistor 176 is conducting. This is the current −Ib mentioned above in the discussion of FIGS. 1–3. Similarly, since a positive potential is applied to data lead 56 at transmitter-receiver 20, current flows from data lead 56 through photo-transistor 177 when that photo-transistor is conducting. This is the current +Ib discussed above in connection with FIGS. 1–3. When photo-transistors 176 and 177 are nonconducting, no current flows in data lead 52 and 56. The data pulses applied to terminal 171 therefore cause corresponding current pulses in data leads 52 and 56. These current pulses are complementary as shown in FIGS. 3*a* and 3*b*, respectively. The system is preferably balanced so that when it is operating normally, the current flowing through photo-transistor 176 to data lead 52 is preferably substantially the same as the current flowing from data lead 56 through photo-transistor 117. Accordingly, there is normally negligible net current in common lead 54.

Central station transmitter-receiver 20 receives the data thus transmitted by transmitter-receiver 30 by sensing the current pulses in data leads 52 and 56. The apparatus for sensing these current pulses in data lead 52 includes light emitting diode 144 which is optically coupled to photo-transistor 146. Photo-transistor 146 is connected in series with resistor 148 between potential source +V2 and logic ground. Data output terminal 150 is connected to a point intermediate resistor 148 and the collector of photo-transistor 146. The apparatus for sensing the current pulses in data lead 56 similarly includes light emitting diode 145 coupled to photo-transistor 147. Photo-transistor 147 is connected in series with resistor 149 between potential source +V2 and logic ground, and data output terminal 151 is connected to a point intermediate the collector of photo-transistor 147 and resistor 149. Current pulses −Ib in data lead 52 flow through light emitting diode 144 causing that device to emit corresponding light pulses. These light pulses cause photo-transistor 146 to conduct, thereby applying voltage pulses corresponding to the current pulses on data lead 52 to data output terminal 150. The circuitry associated with light emitting diode 145 functions similarly to apply voltage pulses corresponding to the current pulses +Ib in data lead 56 to data output terminal 151. Normally, the data output signals applied to terminals 150 and 151 will be the same. A selected one or both of these signals are applied to central station signal controller 18 (FIG. 1) for interpretation.

With the exception of the ground detection apparatus including elements 162–169 discussed in detail below, the normal operation of the transmission line apparatus in the embodiment shown in FIG. 4 has now been fully described. Operation of the system under various transmission line fault conditions and the apparatus provided for detecting and identifying the various fault conditions will now be described. In the particular embodiment shown in the drawing, all fault conditions are detected during transmission of data from a remote station to the central station. However, it will be understood that many of these fault conditions can be alternatively detected during transmission of data from the central station to the remote stations, and it will be readily apparent from the following discussion how this can be accomplished if desired.

FIG. 5 shows fault detector 22 (FIG. 1) and related apparatus in greater detail. Flip-flop 210 and logical NAND gates 212, 214, and 216 may conveniently be part of central station transmitter-receiver 20. The reply data received by central station transmitter-receiver 20 via data leads 52 and 56 is respectively applied to terminals 150 and 151, corresponding to data output terminals 150 and 151 in FIG. 4. Flip-flop 210 changes state each time a control pulse is applied to terminal 208 from central station controller 18. Depending on the state of flip-flop 210, one or the other of logical NAND gagtes 212 or 214 is enabled by flip-flop 210 to pass the data applied to it from terminal 150 or 151, respectively, to logical NAND gate 216. The data applied to NAND gate 216 is applied to central station controller 18 via terminal 218 for decoding and interpretation as described above. This apparatus permits central station controller 18 to receive data from only a selected one of data leads 52 or 56 at any given time. In this way the system is protected from a transmission line fault which affects data transmission on one of these leads. If central station controller 18 is not receiving satisfactory data, controller 18 produces an output signal pulse applied to terminal 208 for changing the state of flip-flop 210 so that the controller will receive data from the other one of data leads 52 and 56.

The Q output signal of flip-flop 210 is also applied to control decoder 250 so that the state of flip-flop 210 is one input to that device.

The received data signals applied to terminals 150 and 151 are respectively applied to data signal analyzers 220 and 221. Each of data signal analyzers 220 and 221 analyzes the data signal applied to it to determine whether or not data is being received on the associated data lead, and if not, whether the cause is a substantial absence of current in the data lead (as would be the result if the data lead is broken) or the presence of a substantially constant current in the data lead (as would be the result if the data lead is short circuited to the common lead). Since data is transmitted by the presence or absence of current, data signal analyzers 220 and 221 must integrate the applied data signal over a period of time which is normally long enough to include intervals of both current flow and no current flow in the associated data lead. Typically, the transmission interval over which the data signal is integrated must be at least as long as the time required to transmit several bits of information which are not likely to be all of the same value (i.e., all binary 0 or all binary 1). Preferably the transmission interval over which the data signal is integrated is at least as long as the time required to transmit a "word" of information (a word being a substantial number of bits which can never be all of the same value), and may be as long as the time required to transmit several words of information. The integration may be performed by analog or digital means.

Each data signal analyzer 220, 221 produces output signals applied to decoder 230 indicating whether or not data is being received on the associated data lead, and if not, whether the cause is a substantial absence of current or a substantially constant current in the associated data lead. Accordingly, each of data signal analyzers 220 and 221 and the associated elements for applying the received data signal thereto comprise means for detecting the substantial absence of current in the associated data lead during a predetermined transmission interval, and further comprise means for detecting a substantially constant current in the associated date lead during the predetermined transmission interval. In the particular embodiment shown in the drawing, each data signal analyzer 220, 221 provides this information for the associated data lead by producing a first output signal indicative of whether or not data is being received on the associated data lead and a second output signal indicative of the level of the signal applied to the associated data output terminal 150 or 151 (i.e., whether that signal is high (at or near +V2) indicating that no current is flowing in the associated data lead, or low (at or near logic ground) indicating that current is flowing in the associated data lead). A suitable digital embodiment of data signal analyzers 220 and 221 is shown in FIG. 7 and described below.

The signals applied to decoder 230 via terminals 168 and 169 are the output signals of the line ground detector apparatus in central station transmitter-receiver 20. As shown in FIG. 4, this apparatus includes oppositely polarized light emitting diodes 162, 163 connected in parallel between earth ground 101 and reference potential source 102. If either of data leads 52 or 56 is grounded while transmitter receiver 20 is in the receive mode, current flows through the ground detector between earth ground 101 and reference potential 102. The direction of this current flow is indicated by the illumination of one of light emitting diodes 162 or 163, and this in turn indicates which data lead is grounded. If neither data lead is grounded the potential difference between earth ground and reference potential is too small to cause substantial illumination of either light emitting diode. Illumination of either of light emitting diodes 162, 163 causes the associated photo-transistor 164, 165 to conduct, thereby lowering the potential applied to the associated output terminal 168, 169 from +V2 to logic ground in cooperation with the associated resistor 166, 167. If neither data lead is grounded, the signals applied to terminals 168, 169 will both be approximately +V2.

The signal applied to decoder 230 and control decoder 250 via terminal 232 is a test signal generated periodically by central station controller 18 to cause fault detector 22 to modify transmission line 50 so that it can be tested for a fault condition which is otherwise undetectable. In the particular embodiment shown in the drawing, this special fault condition is an open or broken common lead 54. Since there is normally approximately no net current in common lead 54, a break in that lead has no effect on data transmission in the absence of other fault conditions. Accordingly, if no other fault conditions have been detected by fault detector 22, central station controller 18 periodically generates a test signal applied to terminal 232 to cause fault detector 22 to test for an open common lead 54.

In response to the test signal applied to terminal 232, control decoder 250 produces an output signal applied to either terminal 252 or 253 for opening the normally closed relay contact 128 or 129, respectively, in the data lead 52 or 56 not currently selected by flip-flop 210 as the data lead from which data is being supplied to central station controller 18 via terminal 218. Accordingly, terminals 252 and 253 in FIG. 5 correspond to terminals 252, 253 connected to relay coils 152, 153 and respectively associated with relay contacts 128, 129 in FIG. 4. Control decoder 250 selects which of relay contacts 128, 129 to open on the basis of the state of flip-flop 210 as indicated by the Q output signal of flip-flop 210 which is applied to control decoder 250 as mentioned above. Thus if the Q output signal of flip-flop 210 is logical 1, NAND gate 212 is enabled and data from data lead 52 is applied to central station controller 18 via terminal 218. Control decoder 250 therefore applies a signal to terminal 253 for opening relay contact 129 in data lead 56 when the special test signal is applied to terminal 232. This opens data lead 56. If common lead 54 is intact, data continues to be received via the circuit including data lead 52 and common lead 54, and data signal analyzer 220 indicates satisfactory data reception to decoder 230. Decoder 230 therefore detects no faults in the transmission line, and after a predetermined test interval, the test signal applied to terminal 232 is discontinued, relay contact 129 closes, and the transmission system reverts to normal condition. If, however, data is not received via transmission line 52 when relay contact 129 is open, common lead 54 is broken. Data signal analyzer 220 indicates that no data is being received from data lead 52 and decoder 230 accordingly indicates that common lead 54 is broken. After the predetermined test interval, the test signal applied to terminal 232 is discontinued, relay contact 129 closes, and the system again transmits data satisfactorily even though common lead 54 is broken. The fact that common lead 54 is broken is displayed by fault display 24, and the fact that a transmission line fault of some kind has been detected is indicated by control decoder 250 which produces a fault alarm signal applied to terminal 251 when any type of transmission line fault is detected by fault detector 22. This fault alarm signal is applied to central station controller 18 as mentioned above. In response to this fault alarm signal, central station controller 18 may cause alarm display and system controller 16 to indicate the occurrence of an alarm condition. In addition, central station controller 18 may discontinue production of the periodic test signal applied to terminal 232 in FIG. 5 so that there are no further interruptions of data transmission, if possible, while a transmission line fault remains uncorrected.

Since the special test described above requires analysis of the output signals of data signal analyzer 220 or 221, the special test signal must by synchronized with the operation of the data signal analyzers. In particular, the special test signal preferably begins at the start of a transmission interval analyzed by data signal analyzers 220 and 221, and continues until decoder 230 is subsequently enabled to process the output signals of the data signal analyzers. Since in the embodiment shown in the drawing, all fault detection is done while the central station is in the receive mode, the special test signal can be appropriately synchronized by coordinating it with the transmit-receive signal applied to terminal 130 in FIG. 4. The special test signal is not produced during every operation of data signal analyzers 220 and 221, but is produced during periodic operation of those devices. The manner in which the special test signal can be generated will be more apparent as the description proceeds, particularly from the description of the manner in which the strobe signal discussed below is generated.

The signal applied to decoder 230 via terminal 234 in FIG. 5 is a signal produced by central station controller 18 indicating whether the central station apparatus is in the transmit or receive mode. This signal may therefore be similar to, or the same as, the signal applied to terminal 130 in FIG. 4. This signal generally enables decoder 230 when the central station apparatus is in the receive mode.

It is generally unnecessary to enable decoder 230 each time the central station is in the receive mode. Accordingly, a strobe signal is applied to decoder 230 via terminal 236 during selected receive mode intervals (e.g., every sixth receive mode interval) as an additional enabling signal. This strobe signal may be generated by counting the transitions in the transmit-receive signal applied to terminal 234 and producing a strobe output signal after a predetermined number of such transitions and while a receive signal is applied to terminal 234.

All of the signals applied to the left-hand side of decoder 230 as viewed in FIG. 5 have now been described. The signals applied to the bottom of decoder 230 are the output signals of a plurality of latches or flip-flops, generally designated latches 240 in FIG. 5. Each of latches 240 is set to indicate that an associated transmission line fault condition has been detected. Decoder 230 is a logic network which decodes or logically combines the signals applied to it to produce output signals indicating which, if any, transmission line fault conditions have occurred. These output signals are respectively applied to associated latches 240 to set those latches corresponding to the transmission line fault conditions which have been detected. The output signals of latches 240 are applied to fault display 24 which displays information (e.g., illuminated code numbers, words, or phrases) identifying the fault conditions which have been detected for use by the operator of the system. The output signals of latches 240 are also applied to control decoder 250 which, as mentioned above, produces a fault alarm output signal applied to terminal 251 when any transmission line fault condition is detected, and which may in addition produce output signals applied to terminals 252 and 253 for opening one of data leads 52 or 56 if necessary to permit continued operation of the system despite the transmission line fault condition which has occurred. The output signals of selected latches 240 are also applied to decoder 230, as mentioned above, to permit decoder 230 to take into account the fault conditions which have already been detected and prevent the apparatus from erroneously indicating multiple fault conditions or impossible or confusing combinations of fault conditions (although some combinations of fault conditions can occur and can be detected by decoder 230 and displayed by fault display 24). All of latches 240 are reset by a reset signal applied to terminal 242. This signal may be produced by alarm display and system controller 16 when the operator of the system acknowledges the occurrence of a fault alarm as mentioned above.

In the particular embodiment illustrated in the drawing, eight distinct transmission line fault conditions can be detected. Accordingly, there are eight latches generally designated 240, each latch being uniquely associated with one of the eight detectable fault conditions. Decoder 230 has eight output leads respectively controlling the eight latches, and each latch has an output lead connected to fault display 24, control decoder 250, and (selectively) decoder 230 as mentioned above. Fault display 24 has eight displays, each uniquely associated with one of the eight latches and each being illuminated when the associated latch is set.

The eight detectable fault conditions are respectively designated E1–E8 and are as follows:

E1 — data lead 52 to common lead 54 short circuit;
E2 — lead 56 to common lead 54 short circuit;
E3 — data lead 52 open;
E4 — data lead 56 open;
E5 — data lead 52 grounded;
E6 — data lead 56 grounded;
E7 — common lead 54 open;
E8 — data lead 52 to data lead 56 short circuit.

Each of variables E1–E8 may be used to indicate the state of the associated one of latches 240 (e.g., E1 indicates that a first of the eight latches is set; $\overline{E1}$ indicates that the first latch is reset). For convenience, the eight latches 240 will sometimes also be referred to as latches E1–E8. All of latches 240 are normally reset and decoder 230 produces output signals for setting one or more of the eight latches to indicate that the corresponding transmission line fault conditions exist in accordance with the following logic equations:

$$E1 = REC \cdot STROBE \cdot \overline{DATA1} \cdot \overline{OUT1} \cdot L1GND \cdot \overline{E3} \quad (1)$$

$$E2 = REC \cdot STROBE \cdot \overline{DATA2} \cdot \overline{OUT2} \cdot L2GND \cdot \overline{E4} \quad (2)$$

$$E3 = REC \cdot STROBE \cdot \overline{DATA1} \cdot OUT1 \cdot \overline{TEST} \cdot \overline{E1} \quad (3)$$

$$E4 = REC \cdot STROBE \cdot \overline{DATA2} \cdot OUT2 \cdot \overline{TEST} \cdot \overline{E2} \quad (4)$$

$$E5 = REC \cdot STROBE \cdot \overline{L1GND} \cdot \overline{E1} \quad (5)$$

$$E6 = REC \cdot STROBE \cdot \overline{L2GND} \cdot E2 \quad (6)$$

$$E7 = REC \cdot STROBE \cdot \overline{DATA1} \cdot OUT1 \cdot \overline{DATA2} \cdot OUT2 \quad (7)$$

$$E8 = E1 \cdot E2 \quad (8)$$

where REC is the signal applied to terminal 234 indicating that the central station is in the receive mode; STROBE is the strobe signal applied to terminal 236; DATA1 and DATA2 are the output signals of the data signal analyzers 220 and 221 respectively indicating that data is being received on the asociated data lead 52 or 56 and applied to terminal 150 or 151; OUT1 and OUT2 are the output signals of data signal analyzers 220 and 221 respectively indicating the level of the signal applied to the associated terminal 150 or 151 (for example, OUT1 is high or logical 1 when no current is flowing through light emitting diode 144 in FIG. 4, and low or logical 0 when current is flowing through light emitting diode 144); L1GND and L2GND are the signals applied to terminals 168 and 169 respectively indicating whether the associated data lead 52 or 56 is grounded (for example, L1GND is high or logical 1 when data lead 52 is not grounded, and low or logical 0 when data lead 52 is grounded); and TEST is the special test signal applied to terminal 232 when transmission line 50 is to be tested for an open common lead as discussed above (for example, TEST is high or logical 1 when the special test is to be performed and low or logical 0 otherwise). A line or bar over any variable in the foregoing equations indicates the inverse of that variable, and the raised dot between variable indicates the logical AND of those variables. Decoder 230 comprises logic circuitry for performing the logical operations represented by equations (1)–(8). Suitable logic circuity will be readily apparent to those skilled in the art from equations (1)–(8).

In accordance with equation (1), decoder 230 produces an output signal for setting latch E1 (thereby indicating that data lead 52 is short circuited to common lead 54) when the central station is in the receive mode, a strobe signal is applied to terminal 236, no data is being received on data lead 52 and applied to terminal 150, the level of the signal applied to terminal 150 is low, the level of the signal applied to terminal 168 is high (indicating that data lead 52 is not grounded), and the latch E3 is not set. As will be apparent, if data lead 52 is short circuited to common lead 54 at any point along transmission line 50, there will be a constant flow of current from reference potential source 102 through common lead 54 to potential source 102 through common lead 54 to potential source +V1 via the short circuit and data lead 52 while transmitter-receiver 20 is in the receive mode. Accordingly, transmitter-receiver 20 will receive no data via data lead 52 and the level of the signal applied to terminal 150 will be constantly low while transmitter-receiver 20 is in the receive mode. Latch E1 will therefore be set in accordance with the equation (1) unless data lead 52 is also indicated to be grounded (L1GND low) or latch E3 has been set (indicating that data lead 52 is open). The grounding of data lead 52 may also cause a constant current flow through data lead 52 to potential source −V1 while transmitter-receiver 20 is in the receive mode. Accordingly, if data lead 52 is indicated to be grounded, latch E1 is not set to indicate that it is short circuited to common lead 54. Similarly, if data lead 52 has previously been indicated to be open (latch E3 set), it is not indicated to be short circuited to common lead 54 since this would result in apparently inconsistent fault indications (although it is possible that a data lead could first be found to be open at a given point and then short circuited to the common lead between the open point and transmitter-receiver 20). When latch E1 is set, fault display 24 displays information advising the operator of the system that data lead 52 is short circuited to common lead 54. Control decoder also opens relay contact 128, thereby opening short circuited data lead 52, and produces a fault alarm output signal applied to alarm display and system controller 16 via terminal 251 as mentioned above. Central station controller 18 continues to receive and transmit data satisfactorily via the circuit including data lead 56 and common lead 54. If flip-flop 210 is not in the state which allows data to be received via data lead 56, central station controller produces an output pulse applied to terminal 208 for changing the state of flip-flop 210.

Latch E2 is set in accordance with equation (2) in a manner entirely analogous to the setting of latch E1. When latch E2 is set, fault display 24 displays information advising the operator that data lead 56 is short circuited to common lead 54. Control decoder 250 opens relay contact 129 and produces a fault alarm signal applied to terminal 251. The apparatus continues to transmit and receive data satisfactorily via the circuit including data lead 52 and common lead 54. The state of flip-flop 210 is changed if necessary to permit data to be received via this circuit.

Latch E3 is set in accordance with equation (3) to indicate that data lead 52 is open when the central station is in the receive mode, the strobe signal is applied to terminal 236, no data is being received on data lead 52 and applied to terminal 150, the level of the signal applied to terminal 150 is high, the special test signal is not being applied to terminal 232, and latch E1 is not set. If data lead 52 is broken or open circuited at any point between a remote station which is transmitting data and central station transmitter-receiver 20, no current will flow in data lead 52 while transmitter-receiver 20 is in the receive mode. Accordingly, transmitter-receiver 20 will receive no data via data lead 52 and the level of the signal applied to terminal 150 will be constantly high while transmitter-receiver 20 is in the receive mode. Latch E3 will therefore be set unless the special test signal is being applied to terminal 232 or latch E1 has already been set. If the special test signal is being applied to terminal 232, the indication that data lead 52 is open may be due to the fact that relay contact 128 has been opened for purposes of the special test. Latch E3 is therefore not set while the test signal is applied to terminal 232. Latch E3 is also not set if data lead 52 has previously been indicated to be short circuited to common lead 54 (latch E1 set) since this would result in confusingly conflicting fault indications as noted above. When latch E3 is set, fault display 24 produced an indication that data lead 52 is open circuited and control decoder 250 produces a fault alarm signal applied to terminal 251. The system continues to transmit and receive data satisfactorily via the circuit including data lead 56 and common lead 54. The state of flip-flop 210 is changed as in the discussion of latches E1 and E2 if necessary to permit data to be received via this circuit.

Latch E4 is set in accordance with equation (4) in a manner entirely analogous to the setting of latch E3. A similar fault indication is produced by fault display 24 and a fault alarm signal is produced by control decoder 250. The system continues to transmit and receive data satisfactorily via the circuit including data lead 52 and common lead 54, and the state of fip-flop 210 is changed if necessary to permit data reception via this circuit.

It should be noted that the sytem only detects an open data lead (or open common lead) if the break is at a point between central station transmitter-receiver 20 and the remote station which is attempting to transmit data to the central station when decoder 230 is enabled by a strobe signal applied to terminal 236 (or when the special test signal is applied to terminal 232). Accordingly, these signals are preferably produced frequently enough to insure that all portions of the transmission line are tested periodically for these fault conditions.

Latch E5 is set in accordance with equation (5) to indicate that data lead 52 is grounded when the central station is in the receive mode, the strobe signal is applied to terminal 236, the signal applied to ground detector output terminal 168 is low, and latch E1 has not been set. If data lead 52 is grounded, current flows through light emitting diode 162 (FIG. 4) as discussed above, and the signal applied to terminal 168 drops from +V2 to logic ground. Latch E5 is therefore set unless latch E1 has been previously set. Latch E5 is not set if latch E1 is set to avoid confusingly conflicting fault indications. When latch E5 is set, fault display 24 produces an indication that data lead 52 is grounded and control decoder 250 produces a fault alarm signal applied to terminal 251. The system continues to transmit and receive data satisfactorily, either via the nornal transmission circuit including data leads 52 and 56 if the grounding is not to severe, or via the circuit including data lead 56 and common lead 54. The state of flip-flop 210 is changed if necessary to permit data to be received satisfactorily.

Latch E6 is set in accordance with equation (6) in a manner analogous to the setting of latch E5. An indication that data lead 56 is grounded is produced by fault display 24 and a fault alarm signal is produced by control decoder 250. The system continues to transmit and receive data satisfactorily, the state of flip-flop 210 being changed if necessary.

Latch E7 is set in accordance with the equation (7) to indicate that common lead 54 is open when the central station is in the receive mode, the strobe signal is applied to terminal 236, no data is being received on either data lead 52 or 56 and applied to terminals 150 and 151, and the level of the signals applied to both terminals 150 and 151 is high. This condition means that no data is being received on either data lead and no current is flowing in either data lead. This test could be used to indicate that both data leads are open. In the particular embodiment illustrated herein, however, it is assumed that this condition can occur only when one of the data leads is intentionally opened in response to the special test signal applied to terminal 232 and that this condition therefore indicates that common lead 54 is open. If desired, the setting of latch E7 could be further conditioned on variable TEST. The intentional opening of one of data leads 52, 56 by opening the associated relay contact 128, 129 in response to the special test signal applied to terminal 232 has been described above. No data is received on the data lead thus intentionally opened and no current flows in that data lead. If no data is also received on the other data lead and no current flows in that other data lead, common lead 54 is open and latch E7 is set. When latch E7 is set, fault display 24 produces an indication that common lead 54 is open and control decoder 250 produces a fault alarm signal applied to terminal 251. When the special test signal applied to terminal 232 is discontinued, the intentionally opened relay contact 128 or 129 closes and the system can continue to transmit and receive data via the circuit including data leads 52 and 56. Central station controller 18 may be arranged to halt further periodic generation of the test signal applied to terminal 232 when a fault alarm signal is received while such a test signal is being produced to prevent possible further interruptions in data transmission until the fault alarm is acknowledged by the operator of the system.

Latch E8 is set in accordance with equation (8) to indicate that data leads 52 and 56 are short circuited to one another when both latch E1 and latch E2 are set Latches E1 and E2 are set when the central station is in the receive mode, the strobe signal is applied to terminal 236, no data is received on either data lead, the levels of the signals applied to terminals 150 and 151 are low, the levels of the signals applied to terminals 168 and 169 are high, and latches E3 and E4 are not set. This condition means that no data is being received on either data lead but current is flowing in both data leads. This is the result of a steady flow of current from potential source +V1 (FIG. 4) through diode 145 and data lead 56 to data lead 52 via the short circuit, and then through diode 144 to potential source −V1. This condition also requires that neither data lead is indicated to be grounded (L1GND and L2GND both high) or open circuited (latches E3 and E4 both reset). Equation (8) indicates that this condition is equivalent to the simultaneous short circuiting of data leads 52 and 56 to common lead 54, and indeed in the particular embodiment illustrated herein it does not matter whether data leads 52 and 56 are short circuited directly to one another or short circuited to one another through common lead 54.

When latch E8 is set, fault display 24 produces an indication that data leads 52 and 56 are short circuited to one another. In addition, control decoder 250 opens relay contact 128 or 129, depending on the state of flip-flop 210, and produces a fault alarm signal applied to terminal 251. If data leads 52 and 56 are short circuited directly to one another, the apparatus continues to transmit and receive data satisfactorily via the data lead with the unopened relay contact and common lead 54. If data leads 52 and 56 are short circuited to one another via common lead 54, further communication is impossible.

FIG. 6 shows control decoder 250 and related apparatus in greater detail. The output signals of latches E1–E8 are respectively applied to terminals 301–308. All of these signals are applied to logical OR gate 310, and the output signal of OR gate 310 is applied to terminal 251. Accordingly, when any one or more of latches E1–E8 is set, OR gate 310 produces a fault alarm output signal applied to terminal 251 as discussed above.

The remainder of control decoder 250 generates the signals applied to terminals 252 and 253 for opening normally closed relay contact 128 or 129 (FIG. 4) when the special test for an open common lead 54 is to be performed or when a fault condition has occurred which may cause excessive current flow and/or which interferes with data transmission and is such that satisfactory data transmission can possibly be resumed if one of data leads 52 or 56 is opened.

Considering first the special test condition, the special test signl (TEST) is applied to control decoder 250 via terminal 232 and the Q output signal of flip-flop 210 (FIG.5) is applied via terminal 320. The signals applied to terminals 301-308 are all normally logical 0. The signal applied to terminal 301 is applied to one input terminal of logical NAND gate 330 and the signal applied to terminal 302 is applied to one input terminal of logical NAND gate 331. Accordingly, the output signals of NAND gates 330 and 331 are normally logical 1. The signal applied to terminal 308 is inverted by inverter 322 and applied to one input terminal of each of logical NAND gates 330, 331, and 332. The special test signal applied to terminal 232 is inverted by inverter 324 and applied to the remaining input terminal of NAND gate 332. Since the signal applied to terminal 232 is normally logical 0, the signals applied to NAND gate 332 is normally logical 1 and the output signal of that device is normally logical 0. The output signal of NAND gate 332 is applied to one input terminal of logical NAND gates 334 and 335. Accordingly, the output signals of NAND gates 334 and 335 are normally logical 1. The output signals of NAND gates 330 and 331 are respectively applied to one input terminal of logical NAND gates 336 and 337, and the output signals of NAND gates 334 and 335 are respectively applied to the remaining input terminals of NAND gates 336 and 337. Since all the signals applied to NAND gates 336 and 337 are normally logical 1, the output signals of those devices are normally logical 0. These output signals are respectively inverted by inverters 338 and 339, and the inverted signals are respectively applied to terminals 252 and 253. Accordingly, the signals applied to terminals 252 and 253 are normally logical 1 and no current flows through relay coils 152 and 153 in the apparatus of FIG. 4. Relay contacts 128, 129 therefore remain normally closed.

When the transmission apparatus is to be tested for an open common lead, the signal applied to terminal 232 (TEST) goes to logical 1. The output signal of inverter 324 therefore goes to logical 0 and the output signal of NAND gate 332 goes to logical 1. The Q output signal of flip-flop 210 applied to terminal 320 is applied directly to one input terminal of NAND gate 335 and is also inverted by inverter 326 and the inverted signal applied to one input terminal of NAND gate 334. If the Q output signal of flip-flop 210 is logical 1, meaning that the data being received via data lead 52 is the data being applied to central station controller 18, both signals applied to NAND gate 335 are logical 1. The output signal of NAND gate 335 therefore goes to logical 0, the output signal of NAND gate 337 goes to logical 1, and the output signal of inverter 339 goes to logical 0. Accordingly, current flows from potential source +V2 (FIG. 4), through relay coil 153 to terminal 253 and normally closed relay contact 129 opens. The data lead not currently being used as the source of data applied to central station controller 18 (i.e., data lead 56) is thereby opened. If common lead 54 is intact, data continues to be received satisfactorily via the transmission circuit including data lead 52 and common lead 54. If common lead 54 is broken, data is no longer received from data lead 52 and no current flows in that data lead. Since no data is also being received from data lead 56 and no current is flowing in that data lead as a result of open relay contact 129, latch E7 is set to indicate that common lead 54 is open.

If the Q output signal of flip-flop 210 is logical 0 when the test signal applied to terminal 232 goes to logical 1, the output signal of NAND gate 334 (rather than NAND gate 335) goes to logical 0. Accordingly, the signal applied to terminal 252 (rather than terminal 253) goes to logical 0 and relay contact 128 (rather than 129) opens. Otherwise, the result is similar: data continues to be received via data lead 56 if common lead 54 is intact, or no data is received from data lead 56 and latch E7 is accordingly set if common lead 54 is broken. In either case, the data lead which is not currently being used as the source of data applied to central station controller 18 is the data lead which is intentionally opened during the special test for an open common lead 54.

Turning now to the portion of control decoder 250 which opens one of data leads 52 or 56 to prevent excessive current flow and/or attempt to restore satisfactory data transmission when a fault condition of a type which prevents data transmission (regardless of the state of flip-flop 210 in FIG. 5) is detected, these are the fault conditions associated with latches E1, E2, and E8. If latch E1 is set, but latch E2 is not set, latch E8 will also not be set. The signal applied to terminal 302 is inverted by inverter 329 and the inverted signal is applied to one input terminal of NAND gate 330. Accordingly, if latch E1 is set and latches E2 and E8 are not set, all of the signals applied to NAND gate 330 are logical 1 and the output signal of that device is therefore logical 0. This causes the output signal of NAND gate 336 to change from logical 0, as is normal, to logical 1. The output signal of inverter 358 therefore changes to logical 0 and current flows from potential source +V2 (FIG. 4) through relay coil 152 to terminal 252, thereby opening normally closed relay contact 128. This opens data lead 52 and interrupts the possibly excessive flow of current in short circuited leads 52 and 54.

If latch E2 is set, but latch E1 is not set, latch E8 is again also not set. The signal applied to terminal E1 is inverted by inverter 328 and the inverted signal is applied to one input terminal of NAND gate 331. Accordingly, when latch E2 is set and latches E1 and E8 are not set, all of the signals applied to NAND gate 331 are logical 1 and the output signal of that device changes from logical 1, as is normal, to logical 0. The output signal of NAND gate 337 therefore changes to logical 1 and the output signal of inverter 339 changes to logical 0. This opens normally closed relay contact 129, thereby opening data lead 56 and interrupting the possibly excessive flow of current in leads 54 and 56.

If both latches E1 and E2 are set, latch E8 will also be set. The output signal of inverter 322 is therefore logical 0 and the output signals of NAND gate 330 and 331 are logical 1, as is normal. The output signal of NAND gate 332, however, is also logical 1, which is not normal. Elements 326 and 334-339 therefore operate as discussed above in relation to the special test condition to open the relay contact 128 or 129 associated with the data lead not currently selected by flip-flop 210 (FIG. 5) as the data lead rom which received data is supplied to central station controller 18. If latch E8 is set because data leads 52 and 56 are short circuited directly to one another, the opening of one of relay contacts 128, 129 will restore satisfactory data transmission via the circuit including the other data lead and common lead 54. If latch E8 is set because all three leads 52, 54, 56 are short circuited, satisfactory data transmission can only be restored by correcting the fault condition.

FIG. 7 shows an illustrative embodiment of data signal analyzers 220, 221 (FIG. 5). The apparatus shown in FIG. 7 not only performs the functions of data signal analyzers 220 and 221, but also generates the STROBE signal applied to terminal 236 in FIG. 5. The elements comprising data signal analyzer 220 are enclosed within dash-single-dotted line 220 in FIG. 7, and the elements comprising data signal analyzer 221 are enclosed within dash-double-dotted line 221 in that Figure. As is apparent from FIG. 7, element 360 is common to both data signal analyzers.

The data received via data leads 52 and 56 is respectively applied to terminals 150 and 151 in FIG. 7. Accordingly, these terminals correspond respectively to terminals 150 and 151 in FIGS. 4 and 5. The signal applied to terminal 234 is the signal indicating that the transmission apparatus is in the receive mode. Accordingly, terminal 234 in FIG. 7 corresponds to terminal 234 in FIG. 5 and the signal applied thereto is the signal REC discussed above. Counter 360 is a decade counter having binary coded outputs Q1–Q4 representing respectively decimal 1, 2, 4, and 8. The count registered by counter 360 increases by one each time the transmission apparatus switches to the receive mode and the REC signal applied to terminal 234 accordingly goes to logical 1. Counter 360 counts to decimal 9 (Q1 and Q4 logical 1; Q2 and Q3 logical 0) and then resets to begin counting again from decimal 0 (Q1–Q4 all logical 0).

Each time the transmission apparatus switches to the receive mode, NAND gates 350 and 351 are enabled by the logical 1 signal applied to terminal 234. Counters 352 and 353 then count the pulses in the received data signals applied to terminals 150 and 151. Counters 352 and 353 are similar to counter 360, each having decimal coded outputs Q1–Q4, respectively representing decimal 1, 2, 4, and 8. In the case of counters 352 and 353, however, only output Q4 is used. Counters 352 and 353 are reset to 0 each time counter 360 counts to decimal 8 (Q4 of counter 360 logical 1). In addition, each of counters 352, 353 stops counting when it reaches a count of decimal 8 (Q4 of counter 352 or 353 logical 1).

The Q2 and Q3 output signals of counter 360 are applied to two input terminals of NAND gate 364. The Q4 output signal of counter 360 is inverted by inverter 362 and applied to the remaining input terminal of NAND gate 364. Accordingly, the signals applied to NAND gate 364 all become logical 1 until counter 360 reaches a count of decimal 6 and remain logical 1 until counter 360 reaches a count of decimal 8, at which time counters 352 and 353 are reset to 0. While all the signals applied to NAND gate 364 are logical 1, the output signal of that device is logical 0. This signal is inverted by inverter 366 to produce the STROBE signal applied to terminal 236 which corresponds to terminal 236 in FIG. 5. As is evident from equations (1)–(8), all of the tests for transmission line fault conditions are conducted while the transmission apparatus is in the receive mode and while the STROBE signal is thus applied to terminal 236.

The Q4 output signal of counter 352 is inverted by inverter 354 to produce the $\overline{\text{DATA1}}$ signal applied to terminal 356 and required by decoder 230 in FIG. 5. Similarly, the Q4 output signal of counter 353 is inverted by inverter 355 to produce the $\overline{\text{DATA2}}$ signal applied to terminal 357 and also required by decoder 230. The data signal applied to terminal 150 is applied directly to terminal 358 to produce the OUT1 signal required by decoder 230, and the signal applied to terminal 151 is similarly applied to terminal 359 to produce the OUT2 signal required by decoder 230. Thus, counter 352 must have counted at least 8 pulses by the time the transmission apparatus switches to the receive mode for the sixth time after counter 360 was last reset to 0 or the $\overline{\text{DATA1}}$ signal applied to terminal 356 will be logical 1 indicating that no data is being received on data lead 52. Since all data transmitted by the remote stations will include some combination of logical 1 and logical 0 pulses, counter 352 will always count to decimal 8 during any six successive data reception intervals unless data is not being received on data lead 52. Similarly, counter 353 will always count to decimal 8 during six successive data reception intervals unless data is not being received on data lead 56. In that event, the $\overline{\text{DATA2}}$ signal applied to terminal 357 will be logical 1 when counter 360 counts to decimal 6 and produces the STROBE signal applied to terminal 236. The data signal analyzers shown in FIG. 7 therefore analyze or effectively integrate the data signal applied to them over six successive data reception intervals and produce output signals indicative of whether there has been a substantial absence of current or a substantially constant current in the associated data lead during that transmission interval. The $\overline{\text{DATA1}}$ or $\overline{\text{DATA2}}$ signal indicates that there has been no data received during the last six data reception intervals, and the OUT1 or OUT2 signal indicates that there is now either a current or no current in the associated data lead.

Although digital data signal analyzers 220, 221 are shown in FIG. 7, it will be apparent that analog data signal analyzers can be used if desired. For example, analog signal analyzers can be used which integrate the received data signals (applied to terminals 150 and 151 in FIG. 4) over a predetermined transmission interval by analog means and produce signals indicating the substantial absence of current flow in the associated data lead if the integrated signal is above a first relatively high threshold level or a substantially constant current flow in the associated data lead if the integrated signal is below a second relatively low threshold level. Similarly, although apparatus has been shown which produces the STROBE signal during every sixth data reception interval, it will be understood that the apparatus can be readily modified to produce the STROBE signal more or less frequently as desired.

Although in the embodiment shown in FIGS. 4–7 broken and short circuited leads are detected by the substantial absence of current in data lead 52 or 56 or by the presence of substantially constant current in those data leads, these transmission line fault conditions can alternatively be detected by the presence of current in common lead 54. FIG. 8 shows how a portion of the apparatus of FIG. 4 can be modified to detect these fault conditions in this manner. (Except for the additional elements shown in FIG. 8, the apparatus may be identical to that shown in FIG. 4.) This alternative takes advantage of the fact that there is normally substantially no net current in common lead 54. Assuming again that all fault detection is done while the central station is in the receive mode, a broken data lead or a data lead which is short circuited to common lead 54 produces a current flow in common lead 54. The type of fault (i.e., whether a broken or short circuited data lead) can be determined by other means such as by detecting the presence of a substantially constant current in a data lead to indicate a short circuit. The direction of current flow in common lead 54 indicates which data lead is experiencing the fault condition. This in turn is indicated by which of oppositely polarized light emitting diodes 370 or 371 connected in parallel between common lead 54 and reference potential 102 is illuminated. Photo-detector circuits 372 and 373, similar to the photo-detector circuits associated with other light emitting diodes such as 144 in FIG. 4, are respectively associated with light emitting diodes 370 and 371 for producing output signals applied to terminals 374 and 375 when diodes 370 and 371 are illuminated. These signals are applied to fault detection circuitry similar to that discussed above.

With this alternative apparatus, an open common lead can be detected by intentionally opening one of data leads 52 or 56 as in the previously discussed embodiment and simultaneously testing for current flow in common lead 54. If no such current flow is detected, as indicated by the fact that neither of diodes 370 or 371 is illuminated, common lead 54 is broken.

In addition to the special test for detecting an open common lead, another special test can be provided for detecting a grounded common lead. FIG. 9 shows how the apparatus of FIG. 4 can be modified to perform this test. As shown in FIG. 9, a second ground detection circuit including light emitting diode 380 normally open relay contact 382 is connected between data lead 52 and earth ground in central station transmitter-receiver 20. Photo-detector circuit 384 is associated with light emitting diode 380 for detecting a flow of current through light emitting diode 380. Normally closed relay contact 386 is connected between reference potential source 102 and the first ground detection circuit (including diodes 162 and 163 as shown in FIG. 4) or at any other point in the first ground detection circuit which will disconnect and disable that circuit when relay contact 386 is opened. Relay contacts 382 and 386 may be mechanically interconnected as shown by dotted line 388 so that when normally open relay contact 382 is closed, normally closed relay contact 386 is opened, and vice versa. In other respects, the apparatus of FIG. 9 may be as shown in FIG. 4.

To detect the grounding of common lead 54, relay contact 382 is closed (and relay contact 386 is opened) while central station transmitter-receiver 20 is in the receive mode and data lead 52 is accordingly connected to potential source $-V1$. If common lead 54 is grounded when relay contact 382 is thus closed, current flows from reference potential source 102 through light emitting diode 380 to potential source $-V1$ via grounded common lead 54. This flow of current is detected by photo-detector 384. Unless common lead 54 is grounded when relay contact 382 is closed, the flow of current through light emitting diode 380 is insufficient to trigger photo-detector 384. The impedance of the second ground detector circuit may be adjusted, if necessary, by means of a resistor in series with diode 380. The first ground detection circuit must be disconnected by opening relay contact 386 when relay contact 382 is closed to connect the second ground detection circuit so that reference potential source 102 is not connected to ground through the first ground detection circuit and is connected to ground, if at all, only as a result of a fault condition.

Relay contacts 382 and 386 may be controlled by a special test signal generated periodically in a manner similar to the generation of the special test signal (TEST) described above for testing the apparatus for an open common lead.

Although in the particular embodiment shown in FIG. 9, the second ground detection circuit is connected between data lead 52 and earth ground, it will be understood that the second ground detection circuit can alternatively be connected between data lead 56 and earth ground, or that the second ground detection circuit may comprise two similar circuits respectively connected between both data leads and earth ground.

It is to be understood that the embodiments shown and described herein are illustrative of the principles of this invention only and that modifications can be implemented by those skilled in the art without departing from the scope and spirit of the invention. For example, although particular logic circuits are shown in the drawings, other logic circuits which produce similar results can be substituted if desired.

What is claimed is:

1. In a central station system for operation under normal transmission line conditions in which there are no disabling transmission line faults, said system including a central station and at least one remote station, apparatus for transmitting information between the central and remote stations comprising:

first and second signal conductors connected in parallel between the central and remote stations;

first and second central station transmitter means for respectively applying first and second signals to said first and second conductors when information is to be transmitted from the central station to the remote station, each of said first and second signals being representative of the information to be transmitted, said first and second signals being respectively characterized by first and opposite second polarities with respect to a reference potential;

first and second remote station receiver means for respectively detecting signals of said first and second polarities respectively applied to said first and second conductors and for producing an output signal representative of either of said signals;

first and second remote station transmitter means for respectively applying third and fourth signals to said first and second conductors when information is to be transmitted from the remote station to the central station, each of said third and fourth signals being representative of the information to be transmitted, said third and fourth signals being respectively characterized by said second and first polarities; and first and second central station receiver means for respectively detecting signals of said second and first polarities respectively applied to said first and second conductors and for producing an output signal representative of either of said signals.

2. The apparatus defined in claim 1 further comprising first and second potential sources respectively characterized by said first and second polarities, and wherein said first and second central station transmitter means respectively comprise first and second switching means for selectively connecting said first and second potential sources to said first and second conductors to produce said first and second signals.

3. The apparatus defined in claim 2 wherein said first and second remote station receiver means respectively comprise:

first and second diode means connected between said first and second conductors and a source of said reference potential for respectively passing current only when said first and second conductors are respectively connected to said first and second potential sources; and means for detecting currents flowing through said first and second diode means.

4. The apparatus defined in claim 2 wherein said first and second central station receiver means respectively comprise third and fourth switching means for respectively connecting said second and first potential sources to said first and second conductors and wherein said first and second remote station transmitter means respectively comprise fifth and sixth switching means for selectively connecting said fisrt and second conductors to a source of said reference potential to produce said third and fourth signals.

5. The apparatus defined in claim 4 wherein said first and second central station receiver means further respectively comprise first and second detector means for respectively detecting current flowing through said third and fourth switching means.

6. The apparatus defined in claim 5 wherein said first and second detector means respectively comprise:

third and fourth diode means respectively connected between said third and fourth switching means and said first and second conductors for respectively passing current only when said first and second conductors are respectively connected to said second and first potential sources; and means for detecting the currents flowing through said third and fourth diode means.

7. The apparatus defined in claim 1 wherein the system is also capable of operation under abnormal transmission line conditions in which transmission line faults exist, said apparatus further comprising:

first and second potential sources associated with the central station and respectively characterized by said first and second polarities;

a source of said reference potential associated with the central station; and a third signal conductor connected in parallel between the central and remote stations, said third conductor being connected to said source of reference potential at the central station.

8. The apparatus defined in claim 7 wherein said first and second central station transmitter means respectively comprise first and second switching means for selectively connecting said first and second potential sources to said first and second conductors to produce said first and second signals.

9. The apparatus defined in claim 8 wherein said first and second remote station receiver means respectively comprise:

first and second diode means respectively connected between said first and second conductors and said third conductor for respectively passing current only when said first and second conductors are respectively connected to said first and second potential sources; and means for detecting the currents flowing through said first and second diode means.

10. The apparatus defined in claim 8 wherein said first and second central station receiver means respectively comprise third and fourth switching means for respectively connecting said second and first potential sources to said first and second conductors and wherein said first and second remote station transmitter means respectively comprise fifth and sixth switching means for respectively connecting said first and second conductors to said third conductor to produce said third and fourth signals.

11. The apparatus defined in claim 10 wherein said first and second central station receiver means further respectively comprise first and second detector means for respectively detecting current flowing through said third and fourth switching means.

12. The apparatus defined in claim 11 wherein said first and second detector means respectively comprise:

third and fourth diode means respectively connected between said third and fourth switching means and said first and second conductors for respectively passing current only when said first and second conductors are respectively connected to said second and first potential sources; and means for detecting the currents flowing in said third and fourth diode means.

13. In a central station system including a central station and at least one remote station, apparatus for transmitting information from the remote station to the central station comprising:

a reference potential source associated with the central station;

first and second potential sources associated with the central station respectively characterized by positive and negative polarities with respect to said reference potential;

first, second, and third conductors connected in parallel between the central and remote stations, said conductors being respectively connected to said first, second, and reference potential sources at the central station;

transmitter means associated with the remote station for selectively connecting said first and second conductors to said third conductor to cause substantially equal and opposite currents to flow in said first and second conductors when information is to be transmitted from the remote station to the central station, the currents in each of said conductors being representative of the information to be transmitted, and receiver means associated with the central station for detecting the currents flowing in either of said first and second conductors to produce an output signal representative of the information transmitted from the remote station.

14. The apparatus defined in claim 13 further comprising means for detecting the substantial absence of current in either of said first and second conductors during a predetermined transmission interval to indicate that the conductor carrying substantially no current is broken.

15. The apparatus defined in claim 13 further comprising means for opening one of said first and second conductors during a predetermined transmission interval and simultaneously detecting the substantial absence of current in the remaining one of said first and second conductors to indicate that said third conductor is broken.

16. The apparatus defined in claim 13 further comprising means for detecting a substantially constant current in either of said first and second conductors during a predetermined transmission interval to indicate that the conductor carrying the substantially constant current is short circuited with said third conductor.

17. The apparatus defined in claim 16 further comprising means responsive to said means for detecting for opening the one of said first and second conductors indicated to be short circuited with said third conductor.

18. The apparatus defined in claim 13 further comprising means for detecting a substantially constant current in both of said first and second conductors during a predetermined transmission interval to indicate that said first and second conductors are short circuited to one another.

19. The apparatus defined in claim 18 further comprising means responsive to said means for detecting for opening one of said first and second conductors.

20. The apparatus defined in claim 13 further comprising ground detection circuit means connected between said source of reference potential and ground and means for detecting a current in said ground detection circuit means to indicate that one of said first and second conductors is grounded.

21. The apparatus defined in claim 20 further comprising means for detecting the direction of current flow in said ground detection circuit means to indicate which of said first and second conductors is grounded.

22. The apparatus defined in claim 13 further comprising:

ground detection circuit means connected between one of said first and second conductors and ground; and means for detecting a flow of current in said ground detection circuit means to indicate that said third conductor is grounded.

23. The apparatus defined in claim 13 further comprising means for detecting a flow of current in said third conductor to indicate that one of said first and second conductors is broken or short circuited to said third conductor.

24. The apparatus defined in claim 13 further comprising means for detecting the direction of current flow in said third conductor as an indication of which of said first and second conductors is broken or short circuited to said third conductor.

25. The apparatus defined in claim 13 further comprising means for opening one of said first and second conductors and simultaneously testing for a flow of current in said third conductor to indicate that said third conductor is broken if there is no current flow in said third conductor.

26. In a central station system including a central station and at least one remote station, apparatus for transmitting information between the central and remote stations comprising:

a reference potential source associated with the central station;

first and second potential sources associated with the central station and respectively characterized by first and opposite second polarities with respect to said reference potential;

first, second, and third conductors connected in parallel between the central and remote stations, said third conductor being connected to said reference potential source at the central station;

first and second central station transmitter means respectively connected between said first and second potential sources and said first and second conductors for applying complementary signals respectively characterized by said first and second polarities to said first and second conductors when information is to be transmitted from the central station to the remote station, each of said complementary signals representing the information to be transmitted;

first and second remote station receiver means respectively connected between said first and second conductors and said third conductor, said first remote station receiver means including first diode means for permitting current to flow through said receiver means only when signals of said first polarity are applied to said first conductor and said second remote station receiver means including second diode means for permitting current to flow through said receiver means only when signals of said second polarity are applied to said second conductor, said first and second remote station receiver means further including means for detecting the currents flowing therethrough to produce an output signal representative of the information transmitted from the central station;

first and second central station receiver means for respectively connecting said second and first potential sources to said first and second conductors and for detecting the currents flowing in said first and second conductors when information is to be transmitted from the remote station to the central station to produce an output signal representative of the information transmitted from the remote station; and first and second remote station transmitter means for selectively connecting said first and second conductors, respectively, to said third conductor to apply complementary signals to said first and second conductors when data is to be transmitted from the remote station to the central station, each of said complementary signals being representative of the information to be transmitted.

27. The apparatus defined in claim 26 wherein the apparatus is balanced so that there is normally no net current in said third conductor and wherein said apparatus further comprises means for detecting a current in said third conductor to indicate that one of said first and second conductors is broken or short circuited to said third conductor.

28. The apparatus defined in claim 27 wherein said means for detecting a current in said third conductor comprises means for detecting the direction in which said current is flowing as an indication of which of said first and second conductors is broken or short circuited to said third conductor.

29. The apparatus defined in claim 27 further comprising means for periodically opening one of said first and second conductors during transmission of information between the central and remote stations and simultaneously testing for the presence of a current in said third conductor to indicate that said third conductor is broken if there is no current in said third conductor.

30. The apparatus defined in claim 26 further comprising means for detecting a substantially constant current in either of said first and second conductors during transmission of information between the central and remote stations to indicate that the conductor carrying the substantially constant current is short circuited with said third conductor.

31. The apparatus defined in claim 30 further comprising means responsive to said means for detecting a substantially constant current for opening the one of said first and second conductors indicated to be short circuited with said third conductor.

32. The apparatus defined in claim 26 further comprising means for detecting a substantially constant current in both of said first and second conductors during an intended transmission of data between the central and remote stations to indicate that said first and second conductors are short circuited to one another.

33. The apparatus defined in claim 32 further comprising means responsive to said means for detecting a substantially constant current for opening one of said first and second conductors.

34. The apparatus defined in claim 26 further comprising first ground detection circuit means connected between said source of reference potential and ground and means for detecting a current in said first ground detection circuit means to indicate that one of said first and second conductors is grounded.

35. The apparatus defined in claim 34 wherein said means for detecting a current in said first ground detection circuit comprises means for detecting the direction in which said current is flowing to indicate which of said first and second conductors is grounded.

36. The apparatus defined in claim 26 further comprising:

ground detection circuit means connected between one of said first and second conductors and ground; and means for detecting a flow of current in said ground detection circuit means to indicate that said third conductor is grounded.

37. The apparatus defined in claim 26 further comprising means for detecting the substantial absence of current in either of said first and second conductors during a predetermined transmission interval to indicate that the conductor carrying substantially no current is broken.

38. The apparatus defined in claim 26 further comprising means for opening one of said first and second conductors during a predetermined transmission interval and simultaneously detecting the substantial absence of current in the remaining one of said first and second conductors to indicate that said third conductor is broken.

39. The apparatus defined in claim 34 further comprising:

second ground detection circuit means;

means for selectively connecting said second ground detection circuit means between one of said first and second conductors and simultaneously disconnecting said first ground detection circuit; and means for detecting a flow of current in said second ground detection circuit means to indicate that said third conductor is grounded.

* * * * *